(12) United States Patent
Trigonakis et al.

(10) Patent No.: US 11,675,785 B2
(45) Date of Patent: Jun. 13, 2023

(54) DYNAMIC ASYNCHRONOUS TRAVERSALS FOR DISTRIBUTED GRAPH QUERIES

(71) Applicant: ORACLE INTERNATIONAL CORPORATION, Redwood Shores, CA (US)

(72) Inventors: Vasileios Trigonakis, Zurich (CH); Tomas Faltin, Prague (CZ); Jean-Pierre Lozi, Zurich (CH); Vlad Ioan Haprian, Zurich (CH); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/778,668

(22) Filed: Jan. 31, 2020

(65) Prior Publication Data

US 2021/0240705 A1    Aug. 5, 2021

(51) Int. Cl.
*G06F 16/2452* (2019.01)
*G06F 16/2458* (2019.01)

(52) U.S. Cl.
CPC .... *G06F 16/24526* (2019.01); *G06F 16/2471* (2019.01)

(58) Field of Classification Search
CPC ........... G06F 16/24526; G06F 16/2471; G06F 16/289; G06F 16/9024
See application file for complete search history.

(56) References Cited

U.S. PATENT DOCUMENTS

| | | | |
|---|---|---|---|
| 6,081,801 | A | 6/2000 | Cochrane |
| 6,092,062 | A | 7/2000 | Lohman |
| 6,216,132 | B1 | 4/2001 | Chandra |
| 8,234,233 | B2 | 7/2012 | Zhou |
| 8,316,060 | B1 | 11/2012 | Snyder, II |

(Continued)

FOREIGN PATENT DOCUMENTS

| | | |
|---|---|---|
| CN | 110427359 A | 11/2019 |
| CN | 110609911 A | 12/2019 |

(Continued)

OTHER PUBLICATIONS

Roth, U.S. Appl. No. 16/274,210, filed Feb. 12, 2019, Office Action, dated Oct. 27, 2020.

(Continued)

*Primary Examiner* — Mark D Featherstone
*Assistant Examiner* — Kweku William Halm
(74) *Attorney, Agent, or Firm* — Hickman Becker Bingham Ledesma LLP

(57) ABSTRACT

Techniques are described for enabling in-memory execution of any-sized graph data query by utilizing both depth first search (DFS) principles and breadth first search (BFS) principles to control the amount of memory used during query execution. Specifically, threads implementing a graph DBMS switch between a BFS mode of data traversal and a DFS mode of data traversal. For example, when a thread detects that there are less than a configurable threshold number of intermediate results in memory, the thread enters BFS-based traversal techniques to increase the number of intermediate results in memory. When the thread detects that there are at least the configurable threshold number of intermediate results in memory, the thread enters DFS mode to produce final results, which generally works to move the intermediate results that are currently available in memory to final query results, thereby reducing the number of intermediate results in memory.

18 Claims, 8 Drawing Sheets

(56) References Cited

U.S. PATENT DOCUMENTS

| | | | |
|---|---|---|---|
| 8,321,492 | B1 | 11/2012 | Sengupta et al. |
| 8,543,517 | B2 | 9/2013 | Shotton |
| 8,631,094 | B1 | 1/2014 | Alpert et al. |
| 9,135,565 | B1* | 9/2015 | Khalefa ............. G06F 16/2365 |
| 9,165,283 | B2 | 10/2015 | Scheidl et al. |
| 9,330,411 | B2 | 5/2016 | Zhou |
| 9,535,756 | B2 | 1/2017 | Depner et al. |
| 9,740,536 | B2 | 8/2017 | Van Der Lugt et al. |
| 9,772,890 | B2 | 9/2017 | Ekanadham |
| 10,002,205 | B2 | 6/2018 | Roth et al. |
| 10,445,319 | B2 | 10/2019 | Weld |
| 2005/0015511 | A1 | 1/2005 | Izmailov |
| 2005/0256893 | A1 | 11/2005 | Perry |
| 2006/0256797 | A1 | 11/2006 | Bernabeu-Auban et al. |
| 2008/0098375 | A1 | 4/2008 | Isard |
| 2010/0306216 | A1 | 12/2010 | Andersen |
| 2012/0109889 | A1* | 5/2012 | Wu ..................... G06F 11/3495 707/613 |
| 2012/0166417 | A1 | 6/2012 | Chandramouli |
| 2014/0006503 | A1 | 1/2014 | Serafini |
| 2014/0136555 | A1 | 5/2014 | Jacob |
| 2015/0227582 | A1 | 8/2015 | Gu |
| 2015/0261817 | A1* | 9/2015 | Harris ............... G06F 16/24542 707/718 |
| 2015/0370838 | A1 | 12/2015 | Parades |
| 2016/0063132 | A1 | 3/2016 | Chen |
| 2016/0071233 | A1 | 3/2016 | Macko |
| 2016/0306896 | A1 | 10/2016 | Paradies |
| 2016/0342445 | A1 | 11/2016 | Van Der Lugt |
| 2016/0378769 | A1 | 12/2016 | Hoperoft |
| 2016/0378828 | A1 | 12/2016 | Hoperoft |
| 2017/0004005 | A1 | 1/2017 | Elliott et al. |
| 2017/0060958 | A1 | 3/2017 | Van Rest |
| 2017/0068746 | A1 | 3/2017 | Levin et al. |
| 2017/0091246 | A1 | 3/2017 | Risvik |
| 2017/0118042 | A1* | 4/2017 | Bhattacharya ........ H04L 12/462 |
| 2017/0147644 | A1 | 5/2017 | Lee |
| 2017/0169133 | A1 | 6/2017 | Kim |
| 2017/0177870 | A1 | 6/2017 | Hildebrand |
| 2018/0039709 | A1 | 2/2018 | Chen et al. |
| 2018/0039710 | A1* | 2/2018 | Chen .................. G06F 16/9024 |
| 2018/0075098 | A1 | 3/2018 | Yin |
| 2018/0089270 | A1 | 3/2018 | Qiu |
| 2018/0203897 | A1 | 7/2018 | Van Rest |
| 2018/0210966 | A1 | 7/2018 | Bed |
| 2018/0285401 | A1 | 10/2018 | Dickie |
| 2018/0329953 | A1 | 11/2018 | Weld |
| 2018/0329958 | A1* | 11/2018 | Choudhury ......... G06F 16/2456 |
| 2019/0057539 | A1 | 2/2019 | Stanard et al. |
| 2019/0102154 | A1 | 4/2019 | Koupy |
| 2019/0196890 | A1 | 6/2019 | Bucchi |
| 2019/0205178 | A1 | 7/2019 | Lee et al. |
| 2019/0258401 | A1 | 8/2019 | Li |
| 2019/0325076 | A1 | 10/2019 | Haglin |
| 2019/0354526 | A1 | 11/2019 | Roth |
| 2019/0370695 | A1 | 12/2019 | Chandwani |
| 2020/0117762 | A1 | 4/2020 | Haprian et al. |
| 2020/0242167 | A1 | 7/2020 | Broecheler |
| 2020/0380032 | A1 | 12/2020 | Wills et al. |
| 2020/0401625 | A1 | 12/2020 | Wright |
| 2021/0089580 | A1* | 3/2021 | Deng .................... G06F 16/288 |
| 2021/0110508 | A1 | 4/2021 | Mellempudi et al. |
| 2021/0182315 | A1 | 6/2021 | Haprian |
| 2021/0182316 | A1 | 6/2021 | Haprian |
| 2021/0216590 | A1 | 7/2021 | Delamare |
| 2021/0365457 | A1 | 11/2021 | Venema et al. |
| 2021/0373938 | A1 | 12/2021 | Koupy |
| 2021/0383600 | A1 | 12/2021 | Uhrenholt et al. |
| 2021/0392073 | A1 | 12/2021 | Tonkovic et al. |
| 2022/0179859 | A1 | 6/2022 | Faltin et al. |

FOREIGN PATENT DOCUMENTS

| | | |
|---|---|---|
| JP | 2016106329 A | 6/2016 |
| WO | WO2015099562 A1 | 7/2015 |
| WO | WO2019218814 A1 | 11/2019 |

OTHER PUBLICATIONS

Zhang et al., "REGTT: Accelerating Tree Traversals on GPUs by Exploiting Regularities", dated 2016, 10 pages.

Priya et al., "A Survey on Realizing Memory-Optimized Distributed Graph Processing", IOSR Journal of Engineering (IOSRJEN), vol. 8, Issue 8 dated Aug. 2018, 7 pages.

Lyu et al., "DBL: Reachability Queries on Dynamic Graphs", Technical Report, dated Jan. 4, 2019, 27 pages.

Dekel et al., "Cachesensitive Optimization of Immutable Graph Taversals (CS745 Project Report)", ACM, dated 2015, 9 pages.

Cong et al., "Solving Large, Irregular Graph Problems using Adaptive Work-stealing", dated 2008, 10 pages.

Roth et al., "PGX.D/Async: A Scalable Distributed Graph Pattern Matching Engine", ACM, dated May 19, 2017, 6 pages.

Presta et al., "Large-scale Graph Partitioning with Apache Giraph", Engineering Blog, Facebook Code, dated Apr. 9, 2014, 8 pages.

PGQL, Property Graph Query Language, http://pgql-lang.org, last viewed on Dec. 11, 2019, 5 pages.

Neo4j Graph Platform, https://neo4j.com/, last viewed on Dec. 11, 2019, 11 pages.

Nelson et al., "Latency-Tolerant Software Distributed Shared Memory", dated Jul. 10, 2015, 15 pages.

Karypis, George,Metis, A Software Package for Partitioning Unstructured Graphs, Partitioning Meshes, and Computing Fill-Reducing Orderings of Sparse Matrices Version 5.1.0, dated Mar. 30, 2013, 35pgs.

Databricks, Graph Analysis Tutorial with GraphFrames, https://docs.databricks.com/spark/latest/graph-analysis/graphframes/graph-analysis-tutorial.html, last viewed on Dec. 11, 2019, 3 pages.

Cypher Query Language Developer Guides and Tutorials, Developer Guides, https://neo4j.com/developer/cypher/, last viewed on Dec. 11, 2019, 5 pages.

Apache TinkerPop, The Germlin Grpah Traversal Machine and Language, http://tinkerpop.apache.org/gremlin.html, last viewed on Dec. 11, 2019, 6 pages.

Amazon Neptun—Fast, Reliable Graph Database Built for the Cloud, https://aws.amazon.com/neptune/, last viewed on Dec. 11, 2019, 16 pages.

Viehmann et al., "Introduction to Graph Analytics and Oracle Cloud Service", dated Oct. 22, 2018, 43 pages.

Rest, Oskar van et al., "PGQL: a Property Graph Query Lanuage", ACM, dated 2016, 6 pages.

PGQL, "Property Graph Query Language", Oracle, dated 2019, 5 pages.

Oracle, "Oracle Big Data Appliance X7-2", dated 2017, 10 pages.

Neo4j, "Graph and Machine Learning Algorithms", dated 2019, 9 pages.

Hodler et al., "An Overview of Graph Algorithms in Neo4j", Neo4j, White Paper, dated 2018, 10 pages.

Gonzalez et al., "GraphX: Graph Processing in a Distributed Dataflow Framework", dated 2014, 15 pages.

Apache Spark, "GraphX", Spark 2.3.4 released (/news/spark-2-3-4-released.html), dated Sep. 9, 2019, 3 pages.

Amazon Neptune, "Overview", https://aws.amazon.com/neptune/, last viewed on Mar. 9, 2020, 16 pages.

Amazon Neptune "Features", https://aws.amazon.com/neptune/, 8 pages, last viewed on Mar. 9, 2020.

18C Oracle, "Spatial and Graph Analytics with Oracle Database 18c", White Paper, dated Feb. 2018, 32 pages.

Haprian, U.S. Appl. No. 16/710,740, filed Dec. 11, 2019, Office Action, dated Jul. 1, 2021.

Haprian, U.S. Appl. No. 16/710,719, filed Dec. 11, 2019, Office Action, dated Jul. 1, 2021.

(56) References Cited

OTHER PUBLICATIONS

Rowe, Walker, BMC blogs, "Introduction to the Neo4j Graph Database", https://www.bmc.com/blogs/neo4j-graph-database/, dated Mar. 21, 2019, 19 pages.
Amazon Neptune, "Fast Reliable Graph Database Built for the Cloud", www.aes.amazon.com/neptune, dated Nov. 29, 2017, 20 pages.
ArangoDB, "Distributed Iterative Graph Processing", dated Jun. 26, 2017, 8 pages.
Databricks, "Graph Analysis Tutorial With GraphFrames", dated Mar. 17, 2019, 2 pages.
Elshawi et al., "Big Graph Processing Systems: State-of-the-art and Open Challenges", dated 2015 IEEE First International Conference on Big Data Computing Service and Applications, 10 pages.
Harris, Tim, "Callisto-RTS: Fine-Grain Parallel Loops", dated Jul. 2015, 13 pages.
Ingalls et al., "Eliminating Canceling Edges From the Simulation Graph Model Methodology", Proceedings of the 1996 Winter Simulation Confrence, dated 1996, 8 pages.
Jin et al., "3-HOP: A High Compression Indexing Scheme for Reachability Query", SIGMQD'09, Jun. 29-Jul. 2, 2009, Providence, Rhode Island, USA, 14 pages.
Adcock et al., "Evaluating OpenMP Tasking at Scale for the Computation of Graph Hyperbolicity", IWOMP dated 2013, 13 pages.
Morishima et al., "Performance Evaluations of Graph Database using CUDA and OpenMP Compatible Libraries", ACM SIGARCH Computer Architecture News, dated Jun. 2014, 6 pages.
Tigergraph's Native Parallel Graph, dated 2020, 2 pages.
PGQL 1.2 Specification, "Property Graph Query Language", dated Feb. 20, 2019, 79 pages.
Roth et al., "PGX.D/Async: A Scalable Distributed Graph Pattern Matching Engine", dated 2017 Publication rights licensed to ACM, 6 pages.
Sakr et al., "Large Scale Graph Processing Using Apache Giraph", dated Mar. 20, 2017, 244 pages.
Salihoglu et al. "GPS: A Graph Processing System", SSDBM: Proceedings of the 25th International Conference on Scientific and Statistical Database Management, dated Jul. 2013, 31 pages.
Spark 2.3.4, "GraphX Programming Guide", dated Sep. 9, 2019, 23 pages.
Tada et al., "On the Robustness of the Soft State for Task Scheduling in Large-scale Distributed Computing Environment", IEEE, dated 2008, 7 pages.
Tiger Graph, "Cool Vendor in Data Management", Advanced Analytics on Connected Data, dated 2020, 3 pages.
Low et al. "GraphLab: A New Framework For Parallel Machine Learning", dated 2014, 10 pages.
Tonkovic, U.S. Appl. No. 16/899, 185, filed Jun. 11, 2020, Non-Final Rejection, dated Feb. 17, 2022.
Haprian, U.S. Appl. No. 16/710,740, filed Dec. 11, 2019, Advisory Action, dated Feb. 28, 2022.
Ma et al., "G-SQL: Fast Query Processing via Graph Exploration", Proceedings of the VLDB Endowment, vol. 9, No. 12, DOI: 2150-8097/16/08, dated 2016, 12 pages.
Azure Cosmos DB, "Fast NoSQL Database with Open APIs for any Scale", https://azure.microsoft.com/en-gb/services/cosmos-db, dated 2018, 20 pages.
Boncz et al., Breaking the Memory Wall in MonetDB, Communications of the ACM, vol. 15, No. 12, dated Dec. 2008, 9 pages.
Buleon, "OrientDB—The Multi-Model and Graph Database", Info-H-415: Advanced Databases, http://orientdb.com/docs/last/index.html, dated 2017, 20 pages.
Chen et al., "G-Minor: An Efficient Task-Oriented Graph Mining System", EuroSys 2018, Association for Computing Machinery, https://doi.org/10.1145/3190508.3190545, dated Apr. 2018, 12 pages.
Dave et al., GraphFrames: An Integrated API for Mixing Graph and Relational Queries, Grades 2016, DOI: http://dx.doi.org/10.1145/2960414.2960416, dated Jun. 2016, 8 pages.
David et al., "Asynchronized Concurrency: The Secret to Scaling Concurrent Search Data Structures", ASPLOS 2015, http://dx.doi.org/10.1145/2694344.2694359, dated Mar. 2015, 14 pages.
Dubey et al., "Weaver: A High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.
Hong et al., "PGX.D: A Fast Distributed Graph Processing Engine", High Performance Computing, Networking and Storage Conference, SC 2015, DOI: http://dx.org/10.1145/2807591.2807620, dated Nov. 2015, 12 pages.
Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.
Kankanamge et al., "Graphflow: An Active Graph Database", SIGMOD 2017, DOI: http://dx.doi.org/10.1145/3035918.3056445, dated May 2017, 4 pages.
Khandelwal et al., "ZipG: A Memory-Efficient Graph Store for Interactive Queries", SIGMOD 2017, DOI: http://dx.doi.org/10.1145/3035918.3064012, dated May 2017, 16 pages.
Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.
Abdelaziz et al. "Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.
Lumsdaine et al., "Challenges in Parallel Graph Processing", World Scientific Publishing Company, Parallel Processing Letters, dated Jan. 2007, 16 pages.
Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.
Microsoft Graph Engine, "Graph Engine: Serving Big Graphs in Real-Time", https://www.graphengine.io, dated 2017, 2 pages.
Muller, "Engineering Aggregation Operators for Relational In-Memory Database Systems", Karlsruhe Institute of Technology, Germany, dated 2016, 197 pages.
Openquery.com, "OQGRAPH Engine for MariaDB", https://openquery.com.au/products/graph-engine, dated Apr. 2008, 4 pages.
Page et al., "The PageRank Citation Ranking: Bringing Order to the Web", http://ilpubs.stanford.edu:8090/422/1/1999-66.pdf, dated Jan. 1998, 17 pages.
Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.
Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.
Shao et al., "Trinity: A Distributed Graph Engine on a Memory Cloud", SIGMOD 2013, https://dl.acm.org/doi/abs/10.1145/2463676.2467799, dated Jun. 2013, 12 pages.
Sharma, "Dragon: A Distributed Graph Query Engine", Facebook Engineering, https://code.fb.com/datainfrastructure/dragon-a-distributed-graph-query-engine, dated Mar. 2016, 7 pages.
Spyropoulos et al., "Digree: Building A Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.
The Linux Foundation, "JanusGraph", https://docs.janusgraph.org, dated 2020, 3 pages.
Titan.thinkaurelius.com, Chapter 3: Getting Started, s3.thinkaurelius.com/docs/titan/1.0.0/getting-started.html, dated 2015, 8 pages.
Virtuoso Universal Server, "Data-Driven Agility without Compromise", http://virtuoso.openlinksw.com, dated 2019, 10 pages.
Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

(56) References Cited

OTHER PUBLICATIONS

Labouseur et al., "The G* Graph Database: Efficiently Managing Large Distributed Dynamic Graphs", Springer Science+Business Media, Distrib Parallel Databases, DOI: 10.1007/S10619-014-7140-3, dated Mar. 2014, 36 pages.
Riggan, Taylor, et al., "Using SPARQL explain to understand query execution in Amazon Neptune", AWS Database Blog, https://aws.amazon.com/blogs/database/using-sparql-explain-to-understand-query-execution-in-amazon-neptune/, Sep. 17, 2019, 10 pgs.
Amazon Neptune Features, www.aws.amazon.com/neptune/features/, printed on Oct. 7, 2021, 8 pages.
Delamare, U.S. Appl. No. 16/738,972, filed Jan. 9, 2020, Notice of Allowance and Fees Due, dated Nov. 10, 2021.
Tonkovic, U.S. Appl. No. 16/899,185, filed Jun. 11, 2020, Notice of Allowance and Fees Due, dated Jun. 2, 2022.
Koupy, U.S. Appl. No. 16/883,317, filed May 26, 2020, Notice of Allowance and Fees Due, dated May 27, 2022.
Haprian, U.S. Appl. No. 16/710,740, filed Dec. 11, 2019, Notice of Allowance and Fees Due, dated Jun. 23, 2022.
Haprian, U.S. Appl. No. 16/710,740, filed Dec. 11, 2019, Notice of Allowance and Fees Due, dated Apr. 18, 2022.
Haprian, U.S. Appl. No. 16/710,740, filed Dec. 11, 2019, Notice of Allowance and Fees Due, dated Mar. 23, 2022.
Haprian, U.S. Appl. No. 16/710,719, filed Dec. 11, 2019, Notice of Allowance and Fees Due, dated May 11, 2022.
Faltin, U.S. Appl. No. 17/116,831, filed Dec. 9, 2020, Non-Final Rejection, dated Jan. 18, 2023.
Rahm, "Scalable Graph Analytics", Year 2017, 73 pages.
Holzschuher et al., "Querying a graph database—language selection and performance considerations", 2015, 24 pages.

\* cited by examiner

FIG. 2

| STAGE 210 MATCHING (a) | STAGE 220 MATCHING (b) | STAGE 230 MATCHING (c) |
|---|---|---|
| V0 | V0, V1 | V0, V1, V2 |
| V1 | V0, V2 | V0, V2, V3 |
| V2 | V0, V3 | V0, V3, V4 |
| V3 | V0, V4 | V1, V2, V3 |
| V4 | V1, V2 | . . . |
| | . . . | |

502
A DATABASE SERVER INSTANCE OF A DATABASE MANAGEMENT SYSTEM EXECUTING A QUERY OVER GRAPH DATA MAINTAINED IN A GRAPH DATABASE BY THE DATABASE MANAGEMENT SYSTEM, WHERE THE GRAPH DATA COMPRISES A PLURALITY OF VERTICES AND A PLURALITY OF EDGES THAT REPRESENT RELATIONSHIPS BETWEEN THE PLURALITY OF VERTICES, AND WHERE THE DATABASE SERVER INSTANCE IS IMPLEMENTED BY A PLURALITY OF PROCESSING THREADS RUNNING ON A COMPUTING DEVICE OF THE DATABASE MANAGEMENT SYSTEM

504
A PARTICULAR THREAD, OF THE PLURALITY OF PROCESSING THREADS, DETERMINING THAT THERE ARE LESS THAN A THRESHOLD NUMBER OF INTERMEDIATE RESULTS IN ONE OR MORE INTERMEDIATE RESULT QUEUES

506
IN RESPONSE TO DETERMINING THAT THERE ARE LESS THAN THE THRESHOLD NUMBER OF INTERMEDIATE RESULTS IN THE ONE OR MORE INTERMEDIATE RESULT QUEUES: THE PARTICULAR THREAD USING BREADTH-FIRST TRAVERSAL TECHNIQUES TO PRODUCE A SET OF INTERMEDIATE RESULTS FOR THE QUERY, AND THE PARTICULAR THREAD INSERTING THE SET OF INTERMEDIATE RESULTS INTO AT LEAST ONE INTERMEDIATE RESULT QUEUE OF THE ONE OR MORE INTERMEDIATE RESULT QUEUES

508
AFTER INSERTING THE SET OF INTERMEDIATE RESULTS INTO THE AT LEAST ONE INTERMEDIATE RESULT QUEUE, THE PARTICULAR THREAD USING DEPTH-FIRST TRAVERSAL TECHNIQUES TO PRODUCE ONE OR MORE RESULTS FOR THE QUERY

DYNAMIC ASYNCHRONOUS TRAVERSALS FOR DISTRIBUTED GRAPH QUERIES

RELATED APPLICATIONS

This application is related to U.S. application Ser. No. 16/738,972, titled "Optimizing Graph Queries by Performing Early Pruning", filed Jan. 9, 2020, the entire contents of which are incorporated by reference as if fully set forth herein.

FIELD OF THE INVENTION

The present invention relates to querying graph database data and, more specifically, to optimizing in-memory execution of graph data queries by using dynamic graph data traversal to limit the amount of memory needed to perform query execution.

BACKGROUND

Graph processing is an important tool for data analytics in which fine-grained relationships between data entities are materialized, in a graph database, as graph edges (or simply "edges") between graph vertices (or simply "vertices"). Information about the entities, represented by vertices, and information about relationships between the entities, represented by edges, may be queried and analyzed to gain insights into the represented data.

Graph processing consists of two main approaches: (a) analytics/algorithms, and (b) pattern-matching queries. A graph algorithm, such as PageRank, iteratively explores graph data to identify information encoded in the graph, and can aggregate the identified information. In contrast, pattern-matching queries provide an interface for interactive exploration of graphs similar to what structured query language (SQL) offers for relational databases, with a focus on exploring connections in the data. For simplicity, the term "graph queries" herein refers to graph querying and pattern matching. While graph analytics have been heavily researched, graph queries have attracted far less attention. Nevertheless, graph queries are a very important tool for industry, as indicated by the large number of available graph query engines and languages.

Pattern matching refers to finding patterns in target graph data that are homomorphic to a target path pattern, such as a triangle. In addition to the structural pattern, projections, filters, property accesses, etc., can be added to a graph query (similar to SQL). Herein, graph queries are represented using property graph query language (PGQL), which is a graph query language with a syntax close to SQL. (Additional information about PGQL can be found in "PGQL: a Property Graph Query Language", by Oskar van Rest et al., GRADES 2016, Jun. 24, 2016, the entire contents of which is incorporated by reference as if fully set forth herein.) To illustrate, the following PGQL query counts the number of authors, in target graph data, that "like" each other.
SELECT COUNT(*) MATCH (p1:author)-[:likes]→(p2:author), (p2)-[:likes]→(p1)

Graph queries are a challenging workload because they focus on connections in the data. By following edges, graph query execution explores large parts of the graph, generating large intermediate and final result sets, thereby reflecting a combinatorial explosion effect. For example, on the well-researched Twitter graph, a single-edge query (i.e., (v0)→(v1)) matches the whole graph, counting 1.4 billion results. A two-edge query (i.e., (v0)→(v1)→(v2)) on the Twitter graph illustrates the combinatorial explosion effect in that this query returns about nine trillion matches. Unlike graph queries, graph algorithms do not usually manifest the combinatorial explosion effect as they operate in rounds, accessing the one-hop neighbors at every iteration.

Additionally, graph queries can exhibit extremely irregular access patterns and therefore require low-latency data access. Therefore, because of the required random accesses and resulting missing spatial locality, the traditional approach of 'disk-based with an in-memory cache' of relational databases is not well suited for graph queries. For this reason, high-performance graph query engines attempt to keep data in main memory and scale out to a distributed system in order to handle graphs that exceed the capacity of a single node.

Executing graph queries is even more challenging when the number of results, including intermediate results, becomes large. Very large intermediate and final result sets generally occur when at least one of two scenarios stands: (a) the graph data targeted by the query is large, e.g., a social network; or (b) the query itself defines a long pattern and/or is expected to have a large number of results (e.g., counting cycles (a)→(b)→(c)→(d)→(a)).

Graph databases may be implemented by single-node database systems, multi-node shared-memory database systems, multi-node distributed-memory database systems, multi-tenant database systems, etc. In the context of distributed graph database systems, graph data is typically partitioned across machines, with a set of vertices and the edges connecting those vertices residing in each machine. For example, FIG. 1 depicts a 5-vertex graph database 100 that is partitioned across a computing device 110 (which maintains database data 102) and a computing device 140 (which maintains database data 104). As referred to herein, a computing device "owns" data that is maintained by a database server instance running on the device. Thus, the vertices and edges defined in database data 102 are "owned" by computing device 110, and the vertices and edges defined in database data 104 are "owned" by computing device 140.

According to a non-limiting embodiment, an edge is owned by the machine that owns the source vertex of the edge. The owner of an edge maintains an identifier of a destination vertex of the edge, and an identifier of the owner of the destination vertex, as well as any properties of the edge. Thus, device 110 "owns" vertices v0, v1, and v2 and edges 112, 114, 116, 118, 120, and 122. Further, device 140 "owns" vertices v3 and v4 and edge 126. "Reverse" edge information may also be maintained by the owner of the destination vertex of the edge, where the reverse edge information includes an identifier of the source vertex of the edge and an identifier of the owner of the source vertex.

With respect to the example data depicted in FIG. 1, matching (v0)→(v1) can happen locally at device 110 (i.e., matching local edge 112), while matching (v2)→(v3) requires remote communication between device 110 and device 140 (i.e., matching remote edge 124). Naturally, remote edges are more expensive to match than local edges because of inter-machine communication required to perform remote edge matching. Such communication subjects query execution to network latencies, which generally represent a bottleneck for query execution.

In a single-node graph database system, BFS-based query execution can have important performance benefits due to locality, however, large graphs and queries can still cause memory consumption issues because of the need to maintain large intermediate result sets. Distributed database management systems (DBMSs) could handle the problem of maintaining large intermediate result sets, in-memory, for a query over a very large set of graph data by adding more machines. If the DBMS scales well, adding machines to a distributed system increases the size of memory that is usable by the system, resulting in the system being able to serve larger computations. However, adding machines to a distributed system is expensive and does not address the combinatorial explosion effect for graph query results, but rather moves the limitation of the DBMS in an attempt to avoid the problems resulting from combinatorial explosion. Furthermore, distribution of the data across nodes of a distributed DBMS exacerbates the problem of limited locality during query execution.

Another approach to address the problem of handling large intermediate results, caused by either a large dataset or a complicated query pattern, is utilizing offloading of intermediate results to disk, as performed by relational database systems and adopted by some modern graph database systems, such as Apache Spark GraphFrames. Specifically, intermediate results for graph queries are stored in a fixed amount of memory, and when there is not enough memory for additional intermediate results being produced by query execution, the system off-loads portions of the intermediate result set/computation to disk. In this way, additional required query computation may continue in the freed memory. However, this approach leads to large performance degradation, when compared to in-memory-only query execution, due to the need to serve data from the disk to access intermediate results and/or to continue computations required for the query.

Graph database systems generally use one of the following approaches to perform graph traversal required for query execution—(a) breadth-first search (BFS)-based traversal or (b) depth-first search (DFS)-based traversal.

Breadth First Search-Based Traversal

BFS is the most common runtime technique used by many graph database systems, e.g., Apache Spark GraphFrames, Neo4j, etc. To illustrate BFS-based traversal techniques as part of execution of a graph query, a database server instance applies the query pattern (a)→(b)→(c) against graph database 100 (FIG. 1) using BFS-based techniques. FIG. 2 depicts three stages 210, 220, and 230 of path pattern matching using BFS-based techniques. Specifically, at stage 210, the database server instance matches all possible vertices in database 100 to the (a) vertex of the query path pattern. At stage 220, the database server instance expands the results produced in stage 210 (matching vertex (b) of the query path pattern) to calculate all possible vertex paths through database 100 to match the portion of the query path pattern (a)→(b). Finally, at stage 230 (matching vertex (c) of the query path pattern), the database server instance generates a complete listing of matches to (a)→(b)→(c) in database 100.

BFS-based traversal techniques have several benefits for graph query execution, including being very simple to implement. BFS is also easy to parallelize. Specifically, after every stage of query execution, the set of intermediate results can be split and allocated to different processing entities (e.g., threads running on devices 110 and 140) performing the computation. Further, BFS-based query execution is able to take advantage of any locality in the graph data as the data is stored in memory. For example, it is common that edges having the same source vertex are stored contiguously in memory. With BFS-based query execution, the edges of the source vertex are accessed one after the other, thereby taking advantage of their contiguous storage locations.

Still, BFS has some inherent shortcomings with respect to graph query execution, especially for distributed graph DBMSs. First, because all possible intermediate results are materialized at every stage of query execution, BFS faces problems resulting from the combinatorial explosion effect described above. Second, locality in distributed graph data is much more limited, given that many edges lead to vertices maintained by remote machines. As a result, a large part of the intermediate results produced at each stage of query execution must be sent as inter-machine communications, creating large network bursts. Also, BFS-based query execution on a distributed system is susceptible to work imbalance because one machine might have finished matching a stage, while the rest of the machines still have significant work for that stage.

Depth First Search-Based Traversal

DFS is a classic alternative to BFS. DFS is not commonly deployed for graph queries, in practice, because of the complexities required to achieve good DFS-based query execution performance. Specifically, instead of expanding edge traversal horizontally (as with BFS), DFS-based traversal techniques cause processing entities (performing in parallel within and across the one or more devices of the DBMS, where possible) to complete and match the whole query path pattern one result at a time. For DFS, the DBMS does not need to hold all intermediate results for all possible expansions; only the intermediate result data required for the current path being explored is maintained by each processing entity.

For example, a DBMS attempts to match a vertex (a) from a query path pattern with a first vertex from graph data. If the first match succeeds, the DBMS moves to matching the next vertex (b) in the query path pattern with a vertex in the graph data that is connected to the first matched vertex via a type of edge indicated in the query, if such a type is indicated. If the next match succeeds, the DBMS continues to attempt matching vertices in the query path pattern to vertices in the graph data. If there is no edge/vertex in the graph data that matches at any stage of the query path pattern, the DBMS backtracks to the previously-matched vertex and continues matching from there, excluding vertices in the graph data that were found to not match the query path pattern. Thus, the DBMS attempts to match the whole query path pattern edge by edge. If the DBMS succeeds in matching a sequence of vertices in the graph data to the query path pattern, the set of matched vertices represents a final result of the query.

To illustrate DFS-based execution of a graph query, a database server instance applies the query path pattern (a)→(b)→(c) against graph database 100 (FIG. 1) using DFS-based traversal techniques. FIG. 3 depicts three stages 310, 320, and 330 of query execution that the DBMS moves through when searching for a match to the query path pattern using DFS-based traversal techniques. Specifically, at stage 310 (matching vertex (a) of the query path pattern), the database server instance matches v0 to vertex (a) of the query path pattern. Based on this initial match, the DBMS moves on to stage 320 (matching vertex (b) of the query path pattern) to expand the search from the match of v0 to vertex (a) to a neighbor node of v0. At stage 320, the DBMS matches v1 to vertex (b). Subsequently, the DBMS moves on to stage 330 (matching vertex (c) of the query path pattern) with the identified path prefix (v0)(v1). At stage 330, the DBMS matches v2 to vertex (c) of the query path pattern, thereby finding (v0)(v1)(v2) to be a match for the query path pattern. Accordingly, the DBMS includes this path in the set of final results for the query. Note that the only intermediate result data that is maintained by the DBMS is the data required to explore the current path.

After identifying the final result (v0)(v1)(v2) for the query, the DBMS backtracks to the longest prefix of the identified path that has a neighbor that has yet to be explored, and continues exploration from that point. In the example DFS-based traversal of FIG. 3, the DBMS reverts to the prefix (v0)(v1) and returns to stage 330 (matching vertex (c) of the query path pattern) to determine if an unexplored neighbor of v1 (i.e., v4) is a match for vertex (c) of the query path pattern. Once there are no more neighbors of v1 to explore, the query backtracks to v0 as a match for vertex (a) of the query path pattern and continues DFS-based query execution by entering stage 320 (matching vertex (b) of the query path pattern) and matching v2 with vertex (b). This approach continues until there are no more paths through the graph data that are accessible from v0. The exploration then continues with a different match for vertex (a) of the query path pattern, such as v1.

DFS has an important benefit for graph querying. Specifically, DFS eagerly expands intermediate results to final results, thus reducing the memory footprint required to hold intermediate results. Still, DFS has the disadvantages of discarding any existing locality, and of complicated parallelism (both within and across machines). The lack of locality arises from following patterns in a depth-first manner, resulting in edge chasing (i.e., following one edge after the other), and generally not accessing adjacent edges in order.

Further, DFS-based query execution manifests complications in parallelism, at least partly because the executing DBMS cannot know in advance the size of potential path sets accessible from each step of path exploration. For example, consider the following query, which illustrates the general inability of DFS-based query execution to produce a pool of intermediate results that may be shared among multiple processing entities:

MATCH (a)→(b)→(c) WHERE a.name='Joe Doe'

If only a single vertex, having the value "Joe Doe" for the 'name' property, exists in the target graph data, then only the thread that matches that vertex (a) will have work to do matching vertices (b) and (c) of the query path pattern. Further, even if other processing entities could share that work, the parallelism is limited by the number of edges from the matching vertex.

Additionally, DFS-based graph query execution across the machines of a distributed system can become very expensive given that potential solution paths may span multiple machines of the system. For example, a sender thread may be required to wait for an acknowledgment or for data from one or more remote machines in order to complete a currently matched path, which reduces the efficiency of the thread.

It would be beneficial to limit the amount of memory required to run a query by a graph DBMS while preserving the ability to parallelize work across and within the one or more machines of the graph DBMS.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts stages of path pattern matching using breadth first search-based techniques.

FIG. 5 depicts a flowchart for performing dynamic graph traversal for query execution.

DETAILED DESCRIPTION

Figure 1:
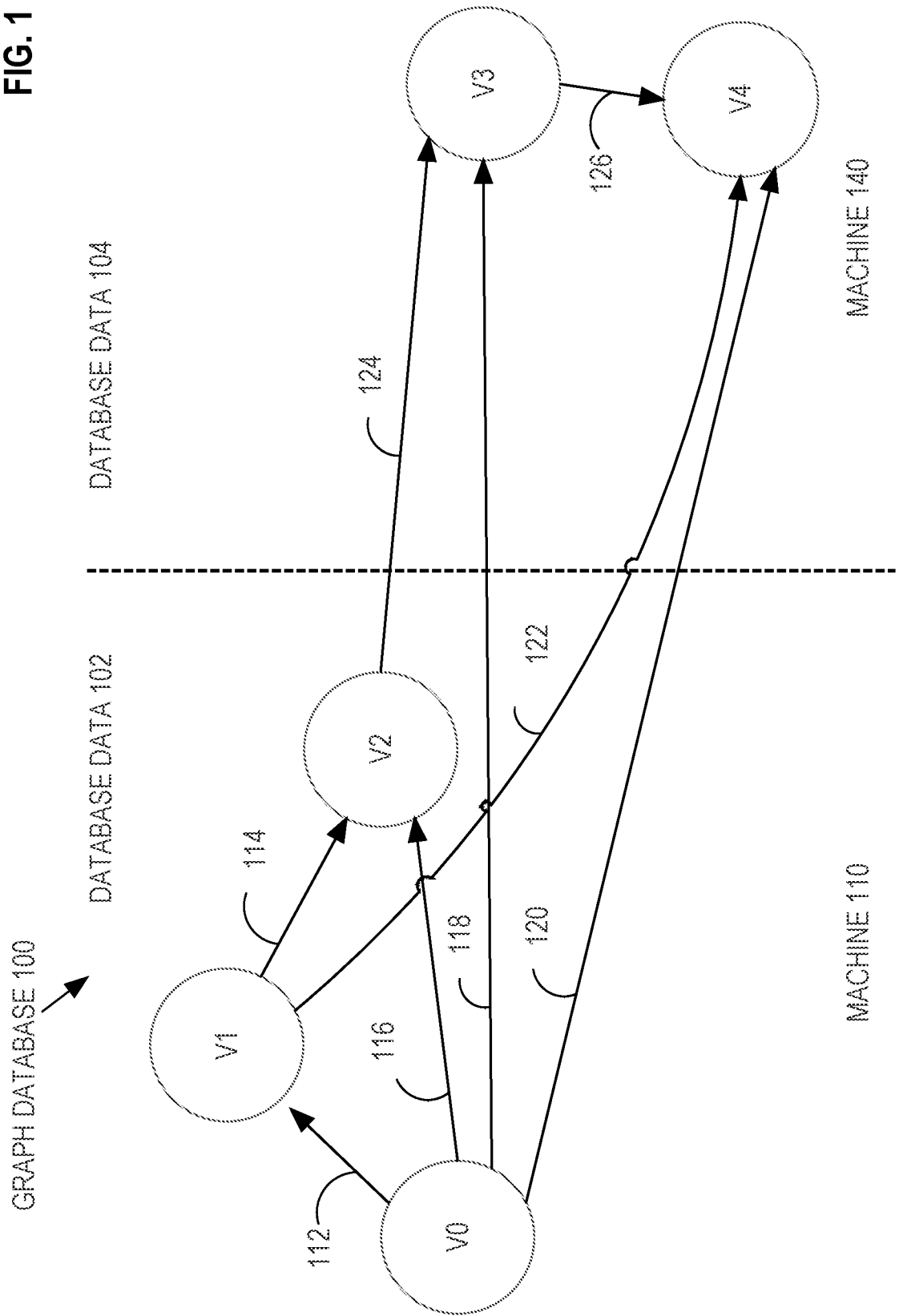
FIG. 1 depicts example graph data maintained by a distributed graph database management system.
Figure 3:
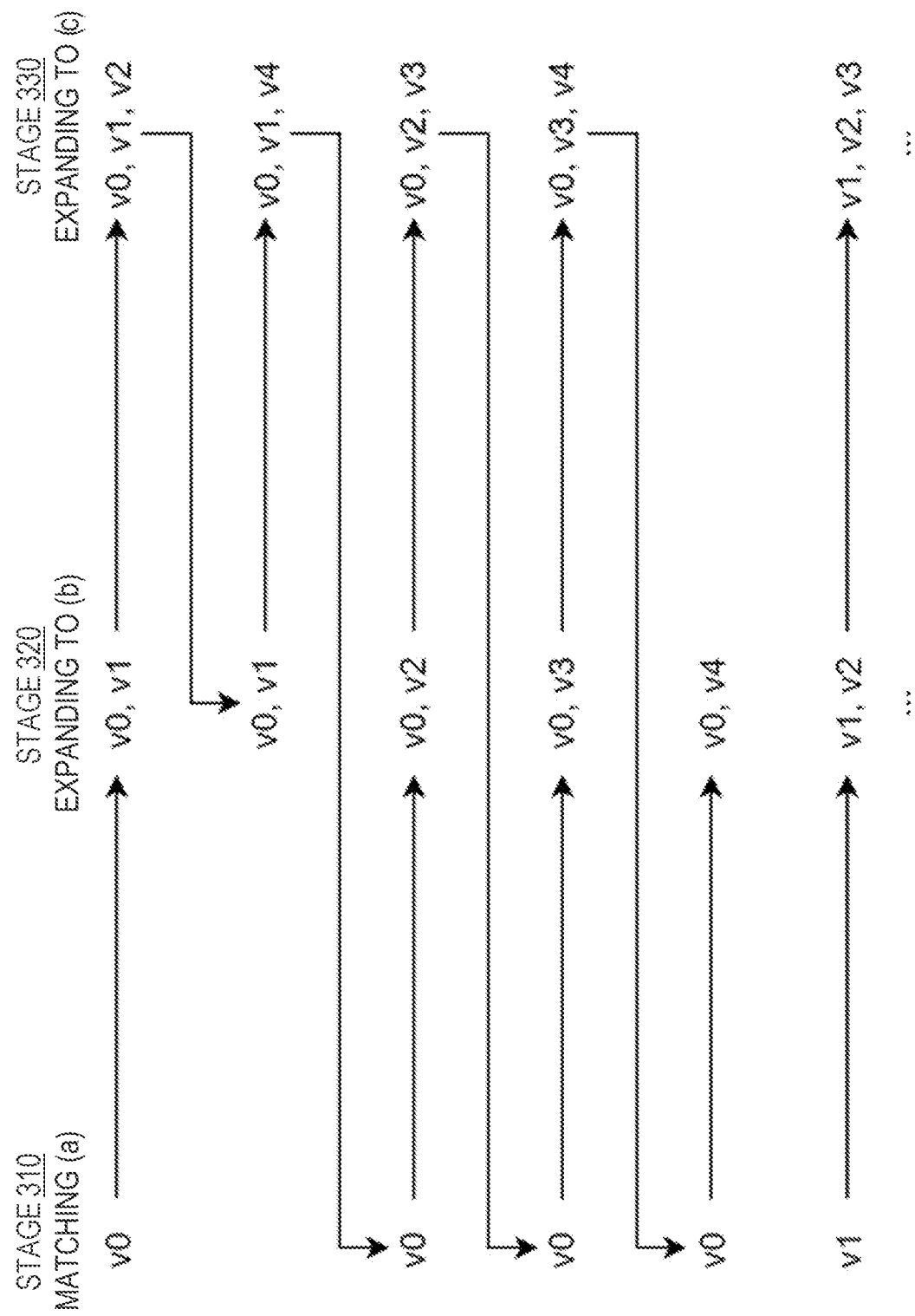
FIG. 3 depicts stages of path pattern matching using depth first search-based techniques.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for enabling in-memory execution of any-sized query by deploying dynamic traversal of graph data that utilizes both depth first search principles and breadth first search principles. Such techniques enable efficient graph query execution that is suitable for graph database management systems, including distributed systems, that have the potential of executing multiple queries at the same time. Specifically, to implement dynamic graph data traversal, processing entities, such as threads operating on multiple machines of a distributed graph database management system, switch between two modes of query exploration: intermediate results production (or BFS) mode, and final results production (or DFS) mode. In BFS mode, processing entities work to increase the number of intermediate results stored in memory, thereby efficiently utilizing machine resources and increasing performance. In DFS mode, entities work to produce final query results where possible, thereby restricting the runtime memory required for query execution.

According to an embodiment, processing entities use the number of intermediate results that are available in memory to determine in which mode to operate. Specifically, when a processing entity detects that there are less than a configurable threshold number of intermediate results in memory of a machine on which the processing entity runs, the processing entity enters (or remains in) BFS mode to increase the number of intermediate results in memory. On the other hand, when a processing entity detects that there are at least the configurable threshold number of intermediate results in memory, the processing entity enters (or remains in) DFS mode to produce final results, which generally works to move the intermediate results that are currently available in memory to final query results, thereby reducing the number of intermediate results in memory.

Note that limiting the number of intermediate results is practically equivalent to limiting the amount of memory during query execution.

According to an embodiment, while in DFS mode, processing entities attempt to operate on intermediate results that correspond to later execution stages of the query. This emphasis on more-advanced intermediate results in DFS mode resolves intermediate results to final results as quickly as possible, thus freeing space for additional intermediate results as quickly as possible. According to an embodiment, while in BFS mode, processing entities attempt to expand intermediate results that correspond to earlier execution stages of the query. This emphasis on less-advanced intermediate results in BFS mode generally works to increase the number of intermediate results as quickly as possible to ensure processing entities have sufficient quantities of intermediate results to expand.

According to an embodiment, a processing entity that identifies a remote edge while in DFS mode or in BFS mode processes the remote edge asynchronously by including the edge in an inter-machine message buffer that is destined for the owner of the destination node of the remote edge. If working in BFS mode, the processing entity continues processing intermediate query results as before. If working in DFS mode, after including the remote edge in an inter-machine message buffer, the processing entity uses BFS-based techniques to identify an alternative solution path to pursue (wherein the next edge may be at the same depth as the identified remote edge) and then proceeds with DFS-based techniques to proceed to the next depths and identify final results, where possible. When an inter-machine message buffer is full, the buffer is sent to the remote machine. The remote machine processes the intermediate results in the received buffer as if the results had been produced locally.

Because techniques being implemented by a distributed DBMS involve asynchronous inter-machine communication of intermediate results, local computation is not blocked or delayed due to remote edges in the local data. Such an asynchronous communication approach enables zero-copy messaging, which greatly improves query execution performance. According to an embodiment, a flow-control mechanism regulates the per-machine resource utilization and guarantees termination to aid in keeping query processing within target memory limits. The flow-control mechanism further guarantees deadlock-freedom and query termination.

Such dynamic traversal of graph data to execute queries turns intermediate results to final results on-demand; this manner of traversing graph data controls the amount of memory required to run a query, including memory required to store intermediate query results, while mitigating complications inherent in DFS-based query execution and avoiding the need to spill any intermediate results to disk. Specifically, DFS-based traversal techniques are used to restricting the runtime memory required for query execution, thereby aggressively completing intermediate results and keeping the memory consumption within limits. Further, BFS-based traversal techniques are used to optimize performance of query execution by increasing opportunities for parallel processing and locality of exploration, thus mitigating the performance complexities of DFS-based execution. Combining the two techniques described herein achieves a limited memory footprint with high-performance, where the memory footprint may be limited to a predefined, fixed amount of memory for the query execution.

Graph Data

Embodiments are described herein in the context of the property-graph model of graph data representation, in which data topology is represented as vertices and edges. In this model, properties of graph data are stored separately, e.g., as metadata of vertices and/or edges. Nevertheless, embodiments may be implemented for graph data that is modeled according to other techniques, such as the resource description framework (RDF) model, which represents the whole graph as a set of triples of the form {subject, predicate, object} and, as such, includes links for every piece of data in the graph, including constant literals.

Figure 4:
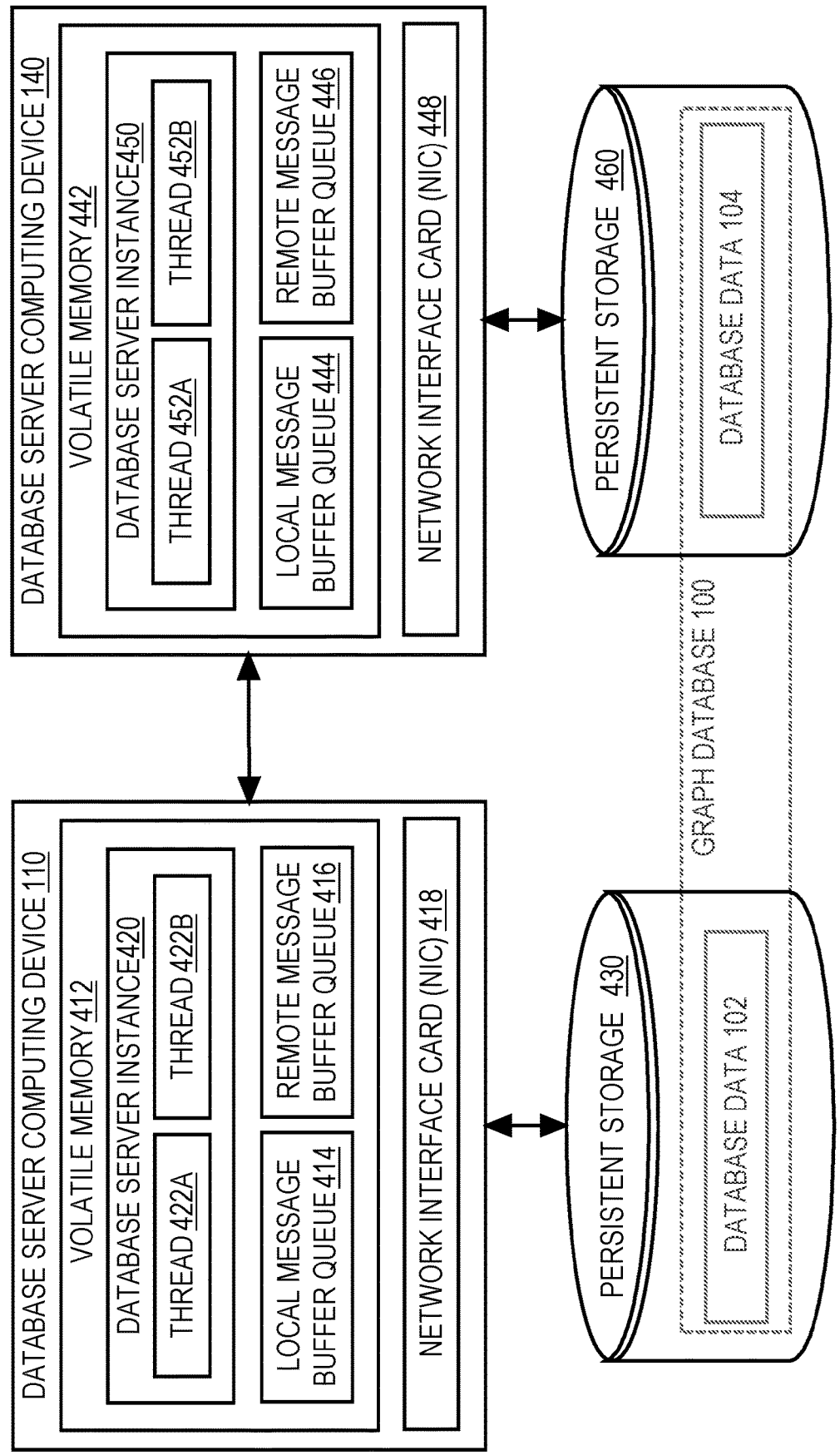
FIG. 4 is a block diagram that depicts an example arrangement for a distributed graph database management system.

Furthermore, embodiments are described using PGQL-style graph pattern matching queries, but may be implemented using any kind of graph query, including SPARQL, Cypher, Gremlin, etc. In its simplest form, graph pattern matching makes it possible to find patterns in graphs with filters. In PGQL, the projection portions of a query, as well as the aggregation operations, are the same as in SQL. In addition to the aspects of PGQL that are similar to SQL, PGQL includes support for graph patterns and vertex and edge labels, which can be used to indicate types of vertices and edges. For example, the following query is a PGQL query that has syntax that might be found in a SQL query, other than the included MATCH clause:

SELECT p1.fullName, p2.fullName, COUNT(p3) AS count
MATCH (p1:person)-[:friend]→(p2)-[:friend]→(p3)
WHERE p1 !=p3
   AND p1.age=p2.age
GROUP BY p1, p2
ORDER BY count DESC Embodiments herein are described in the context of a distributed database system 400 comprising multiple database server instances that maintain database data on disks that are not shared among the multiple database server instances, as depicted in FIG. 4. Nevertheless, techniques described herein for dynamic traversal of graph data may be performed by any implementation of a database system, e.g., on a single-node database system that comprises a single database server instance, on a multi-node shared-memory database system that comprises multiple database server instances that access the same shared storage, on a multi-tenant database system comprising a single database server instance that serves multiple distinct databases, etc.

FIG. 4 depicts an example distributed database system 400 comprising a first database server instance 420 running on a first database server computing device 110, and a second database server instance 450 running on a second database server computing device 140. Instances 420 and 450 maintain portions of a graph database 100, i.e., database data 102 maintained in persistent storage 430 by instance 420, and database data 104 maintained in persistent storage 460 by instance 450. Examples of graph database implementations include Spatial and Graph Analytics Oracle RDBMS, Big Data Appliance, and Oracle Graph Cloud Service. (More information regarding Spatial and Graph Analytics Oracle RDBMS may be found in "Spatial and Graph Analytics with Oracle Database 18c", an Oracle White Paper, February 4018, the entire contents of which are hereby incorporated as if fully set forth herein.)

Querying Graph Data

Upon receiving a query, system 400 determines an execution plan for the query, where the execution plan contains a complete description of the query (i.e., which vertices to match, in which order, with what filters, and what output to produce). The plan includes "stages" and "hops", where a "stage" is responsible for matching exactly one vertex of the query path pattern. The information for a given stage also stores necessary information for matching and transitioning to any subsequent stage. The transitioning between stages happens via respective "hops". The purpose of a hop is to transfer context data from one stage to a subsequent stage of the query plan, which requires migration to a different machine if the information for a required edge or vertex in the graph data resides on a machine that is remote from the machine executing a present stage.

Thus, execution of a query against graph database 100 is split into one or more execution stages, e.g., by a query optimizer of system 400, where each stage of query execution comprises one of (a) exploration of a stage/hop in a path that is a potential solution for the query, or (b) processing of a final vertex in a path that is a potential solution for the query. The stages of query execution may be performed asynchronously and in parallel by multiple processing entities, e.g., multiple instances of a multi-node database system, multiple threads on a single-node database system, multiple threads running on multiple machines of a multi-node database system, etc. References to "processing entities" herein refer to threads and/or database server instances, depending upon implementation.

In the context of distributed system 400 depicted in FIG. 4, both machines initiate path exploration for a given query on every vertex that the machine owns, excluding any vertices that are determined to be filtered out by the query. At each stage of query execution, if property values of a given path do not match query requirements, the processing entity ceases exploration of the path and discards the path from the set of potential query solutions.

To illustrate, database system 400 receives the following Query 1 over graph database 100:
(Query 1)
SELECT a.age, b.age, MIN(c.age) MATCH (a)→(b)→(c) WHERE a.age>40

The path pattern for Query 1 is (a)→(b)→(c). Database system 400 organizes execution of Query 1 into three execution stages, where each stage corresponds to a corresponding vertex in the Query 1 path pattern. In this case, database system 400 causes the first execution stage of Query 1 to be initiated for vertices in graph database 100 that satisfy the filter a.age>40. In the absence of any filter in the query applying to vertex (a), the first execution stage of the query would be initiated for all vertices in the graph database.

Dynamic Traversal for Query Execution

According to one or more embodiments, each processing entity that works to execute a given query runs in one of two modes: intermediate results production (or BFS) mode, and final results production (or DFS) mode. Processing entities use configurable criteria to determine whether to operate in BFS mode or in DFS mode. Because each processing entity determines its mode of operation, processing entities running on a given machine may be running in DFS mode and in BFS mode, respectively, at the same time.

To illustrate, while one or more message queues of a given machine include at least a configurable threshold number of intermediate results, one or more processing entities running on the machine operate in DFS mode to produce final results using DFS-based traversal techniques. Operation in DFS mode allows a processing entity to move intermediate results, stored on the machine, to final results and free up memory on the machine. The results produced by a processing entity operating in DFS mode are either final results (which are included in a final result set), or are intermediate results that include a remote edge (which are sent to remote machines of the DBMS, as described in further detail below).

According to an embodiment, the configurable threshold number of intermediate results is adjustable by administrators of the system. According to an embodiment, the configurable threshold number of intermediate results is automatically configured, by the database system, based, at least in part, on how many other queries are executing, and/or the amount of memory available at a host machine, etc.

While the one or more message queues of the machine include less than the configurable threshold number of intermediate results, one or more processing entities running on the machine operate in BFS mode to produce intermediate results using BFS-based traversal techniques. The one or more processing entities remain in BFS mode until the number of intermediate results in memory of the local machine is at least the configurable threshold number. Embodiments are described herein as utilizing a local message buffer queue that stores intermediate results produced by local processing entities, and a remote message buffer queue that stores intermediate results produced by remote machines and received via a network. Nevertheless, any number of queues may be used to store intermediate results for a given machine, according to an embodiment.

Intermediate Results Production (Bfs) Mode

According to an embodiment, a processing entity that is operating in BFS mode does so in response to determining that there are insufficient intermediate results in one or both of the remote and local message buffer queues for processing entities to avoid being idle. For example, thread 422A of database server instance 420 determines that there are less than a threshold number of intermediate results in both local message buffer queue 414 and remote message buffer queue 416. An example threshold number of intermediate results is a multiple (such as 16, 24, 100, etc.) of the number of processing entities implementing database server instance 420. Note that this threshold is also referred to herein as the target amount of memory for local intermediate results. In response to determining that there are less than the threshold number of intermediate results in queues 414 and 416, thread 422A produces intermediate results in BFS mode.

To illustrate, database management system 400 executes the above-mentioned Query 1, with the query path pattern (a)→(b)→(c). At the time that thread 422A determines that there are less than a threshold number (i.e., 4 times the number of threads (2), which is 8) of intermediate results in queues 414 and 416, local message buffer queue 414 includes the following intermediate results: {a:v0}; {a:v1}. These intermediate results indicate that vertices v0 and v1 (FIG. 1) have been matched with vertex 'a' of the Query 1 path pattern.

Thread 422A picks up an intermediate result from queue 414 and continues computation of Query 1 with respect to this intermediate result, i.e., by continuing with the next query execution stage. For example, thread 422A picks up the intermediate result {a:v0} from queue 414 (thereby removing the result from queue 414). Thread 422A determines that the intermediate result has been processed through the first query execution stage and, as such, expands the intermediate result to the second execution stage using BFS traversal techniques. Accordingly, thread 422A produces the following second stage intermediate results: {a:v0, b:v1}, {a:v0, b:v2}, {a:v0, b:v3}, and {a:v0, b:v4}. As shown in FIG. 1, {a:v0, b:v1} and {a:v0, b:v2} are local results because the information for vertices v1 and v2 are stored in database data 102, and {a:v0, b:v3} and {a:v0, b:v4} are remote results because the information for vertices v3 and v4 are stored in database data 104 maintained by a database server instance running on a different computing device.

Thread 422A buffers the local results in a local message buffer. According to an embodiment, the message buffer is small (e.g., a size that is configured to store a relatively small number of intermediate results, in this example 4 results), which promotes quick turn-around of intermediate results from BFS-based production. Once thread 422A fills the local message buffer, thread 422A shares the message buffer with other processing entities of device 110, i.e., by including the message buffer in local message buffer queue 414. Performing BFS-based traversal until a threshold number of local intermediate results are stored in memory benefits locality and parallelization without escaping the target memory limits.

Remote Edges

Processing entities cause results with remote edges (whether produced in BFS mode or in DFS mode) to be included in one or more inter-machine message buffers. According to an embodiment, inter-machine message buffers are accumulated per target remote machine and are sent to the target machine once the buffers are full. Continuing with the above example using thread 422A, the thread includes {a:v0, b:v3} and {a:v0, b:v4} in an inter-machine message buffer that targets device 140, which is the owner of the destination vertices of the remote edges. After the inter-machine message buffer is full, instance 420 sends the inter-machine message buffer to device 140. According to an embodiment, system 400 implements flow control when sending inter-machine message buffers between machines of the system, which is described in further detail below.

According to an embodiment, inter-machine message buffers are pre-allocated and registered with a network interface controller (NIC), such as NIC 418 of device 110 or NIC 448 of device 140. A NIC is a computer hardware component that connects the device to a network that communicatively connects the device with other devices on the network. In this embodiment, intermediate results with remote edges are directly buffered to the NIC, which enables zero-copy messaging. Specifically, the intermediate results are inserted directly into an inter-machine message buffer registered with NIC 418, which can be sent as-is, without any modification or copying for any underlying messaging library. For example, device 110 produces one or more communication structures, such as packets, directly from the inter-machine message buffer registered with NIC 418, where the packets include respective payloads with data from the inter-machine message buffer. Device 110 sends the packets, over a network, to device 140 using NIC 418.

Once the inter-machine message buffer is received at the destination machine, the database server instance at the destination machine is able to use the intermediate results in the inter-machine message buffer to perform either BFS-based or DFS-based result computations.

Example Implementation

FIG. 5 depicts a flowchart 500 for performing dynamic traversal for query execution, according to an embodiment. Specifically, at step 502 of flowchart 500, a database server instance of a DBMS executes a query over graph data maintained in a graph database by the DBMS, where the graph data comprises a plurality of vertices and a plurality of edges that represent relationships between the plurality of vertices, and where the database server instance is implemented by a plurality of processing threads running on a computing device of the DBMS. Note that executing the query over the graph data comprises steps 504-508 of flowchart 500.

To illustrate step 502, system 400 of FIG. 4 receives the following Query 2 to be run over graph database 100.

(Query 2)

SELECT a.age, b.age MATCH (a)→(b)→(c)→(d) WHERE d.age>=40

System 400 determines an execution plan for Query 2, which includes a stage for each vertex in the Query 2 path pattern (a)→(b)→(c)→(d). During query execution, the database server instances of system 400 apply stages of Query 2 execution to vertices of graph data in database 100, and hops to edges in the database, while fulfilling potential filters (e.g., MATCH (a)→(b)→(c)→(d) WHERE d.age>=40 contains an age filter). Filters generally put restrictions on matched vertices/edges.

Figure 6:
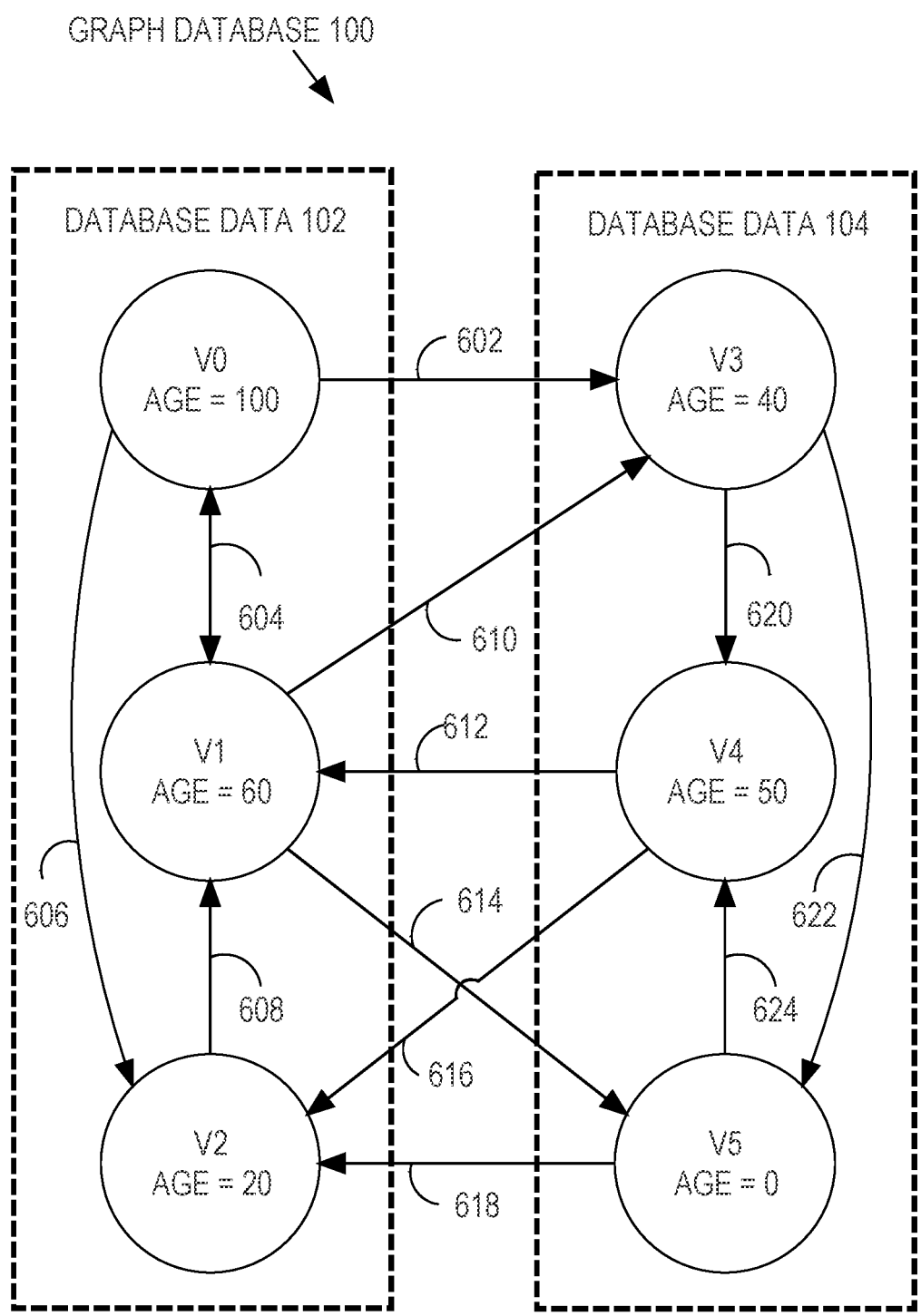
FIG. 6 depicts example graph data maintained by a distributed graph database management system.

For purposes of illustration, the computation of Query 2 begins with initializing evaluation of a first query execution stage, matching vertex (a) of the query path pattern, for each vertex of the graph data of database 100. Initializing evaluation of the first query execution stage on vertices of database 100 is referred to herein as "bootstrapping". According to an embodiment, all vertices being managed by a particular database server instance are uniformly assigned between all processing entities of the instance working to execute Query 2. Each processing entity, working in parallel with the other processing entities, bootstraps the query for its assigned vertices. This way, computation is bootstrapped/initialized from all vertices, and system 400 achieves parallelism across processing entities. To illustrate, FIG. 6 depicts example graph data in database 100, which includes vertices v0-v5 and edges 602-624. Thread 422A is assigned to bootstrap Query 2 for vertices v0-v2 of database data 102 and thread 422B is assigned to bootstrap Query 2 for vertices v6-v9 of database data 102 (not shown in FIG. 6).

At step 504, executing the query over the graph data comprises a particular thread, of the plurality of processing threads, determining that there are less than a threshold number of intermediate results in one or more intermediate result queues. For example, processing entities implementing instance 420 periodically determine whether there are at least a threshold number of intermediate results (such as 4 times the number of processing entities implementing instance 420) in local message buffer queue 414 and remote message buffer queue 416. The periodicity of such a determination for a given processing entity may be established in any way, including based on a number of hops the processing entity has processed since the last determination of a number of local intermediate results, etc.

In this example, thread 422A determines that there are less than the threshold number of intermediate results in both message buffer queues because execution of the query is just starting and has not yet produced the threshold number of intermediate results, or because execution of the query has diminished the number of intermediate results in the queues (as described in further detail below), etc.

At step 506, executing the query over the graph data comprises, in response to determining that there are less than the threshold number of intermediate results in the one or more intermediate result queues: the particular thread using breadth-first traversal techniques to produce a set of intermediate results for the query, and the particular thread inserting the set of intermediate results into at least one intermediate result queue of the one or more intermediate result queues. For example, in response to determining that there are less than the threshold number of intermediate results (e.g., 8 results) in local message buffer queue 414 and remote message buffer queue 416, thread 422A enters intermediate results production (BFS) mode during which thread 422A uses BFS-based traversal techniques to produce intermediate results. According to an embodiment, thread 422A fills one or more message buffers with the intermediate results and causes the one or more message buffers to be included in local message buffer queue 414.

Thread 422A may produce intermediate results, while in BFS mode, in a number of ways, according to embodiments. Specifically, thread 422A produces intermediate results by applying the first stage of the query plan to vertices assigned to the thread, by applying later stages possibly reached following local edges through DFS (before the execution switching to the current BFS mode), or by expanding intermediate results included in either local message buffer queue 414 or remote message buffer queue 416. According to an embodiment, when a processing entity is in BFS mode, priority is given to intermediate results, included in a message buffer queue, that are in the earliest stage of query execution available.

Using Query 2 above as an example, while in BFS mode, thread 422A scans buffer queues 414 and 416 to identify any intermediate results from the first stage of query execution (which matches vertex (a) of the query path pattern) and then intermediate results from the second stage of query execution (which matches vertex (b) of the query path pattern). If thread 422A has expanded all intermediate results, in the buffer queues, which are in early query execution stages, and thread 422A has not yet produced enough intermediate results to fill the one or more message buffer queues, thread 422A applies the first stage of query execution to any vertices assigned to the thread that have not yet been bootstrapped.

According to an embodiment, while in BFS mode, thread 422A does not attempt to expand intermediate results in the third stage of query execution (which matches vertex (c) of the query path pattern) because these intermediate results are a single hop from final results, and expansion of intermediate results in the third stage of query execution would not result in additional intermediate results to store in the buffer queues.

According to an embodiment, thread 422A produces intermediate results by applying later stages possibly reached following local edges through DFS (before the execution switching to the current BFS mode). For example, thread 422A, working in DFS mode, identifies intermediate results for Query 2 by following local hops from the first stage of Query 2 execution to the second stage of Query 2 execution, and then to the third stage of Query 2 execution. While in the third stage of Query 2 execution, thread 422A switches to BFS mode and continues processing Query 2 from the third stage of execution based on the intermediate result previously produced while the thread was in DFS mode.

To illustrate production of intermediate results in BFS mode in context of the example data depicted in FIG. 6, thread 422A determines that there are no intermediate results in buffer queues 414 and 416, a result of query execution having just begun. Because there are no intermediate results in the buffers, thread 422A enters BFS mode and applies the first stage of query execution to one or more vertices in database data 102 that are assigned to the thread (e.g., v0-v2). Thread 422A produces the following intermediate results: {a:v0}, {a:v1}. In this example, the size of local message buffers is configured to store two intermediate results, which is an illustrative example size. As such, thread 422A fills a local message buffer with the intermediate results {a:v0}, {a:v1} and causes the message buffer to be included in local message buffer queue 414.

Returning to the discussion of flowchart 500, at step 508, executing the query over the graph data comprises, after inserting the set of intermediate results into the at least one intermediate result queue, the particular thread using depth-first traversal techniques to produce one or more results for the query. According to an embodiment, thread 422A automatically returns to final results production (DFS) mode after causing the local message buffer to be included in local message buffer queue 414. According to another embodiment, after causing the local message buffer to be included in local message buffer queue 414, thread 422A determines whether there are at least the threshold number of intermediate results in queues 414 and 416. If there are at least the threshold number of intermediate results in queues 414 and 416, then thread 422A returns to DFS mode. However, if there are still less than the threshold number of intermediate results in queues 414 and 416, thread 422A remains in BFS mode, as described above, until there are at least the threshold number of intermediate results in the message buffer queues or until further BFS cannot be performed, e.g., there are no more edges are left.

To illustrate, after causing the local message buffer to be included in local message buffer queue 414, thread 422A determines whether there are at least the threshold number of intermediate results in queues 414 and 416. In this example, thread 422B also entered BFS mode upon starting query execution and has caused a second message buffer to be included in buffer queue 414. Thus, there are four intermediate results in local message buffer queue 414 and no intermediate results in message buffer queue 416. As such, the threshold number of intermediate results (i.e., 4 times the number of threads (2), which is 8) has not yet been reached.

Accordingly, thread 422A remains in BFS mode. In this iteration of BFS mode, there are intermediate results in queue 414. Thread 422A picks up an intermediate result in the first stage of query execution, e.g., {a:v0}, to expand. Using BFS-based traversal techniques, thread 422A produces the intermediate results {a:v0; b:v1}, and {a:v0, b:v2}, and inserts them into a local message buffer. Because the message buffer is full, thread 422A causes the message buffer to be included in local message buffer queue 414.

While expanding {a:v0} to the second stage of query execution (matching vertex (b) of the query path pattern), thread 422A identifies remote edge 602 with the destination vertex v3, which is stored in database data 104 at device 140. Accordingly, thread 422A produces the remote intermediate result {a:v0; b:v3} and causes the remote intermediate result to be included in an inter-machine message buffer destined for device 140. According to an embodiment, an inter-machine message buffer is registered with the NIC of the machine that maintains the buffer. Once the inter-machine message buffer destined for device 140 is filled, device 110 causes the message buffer to be sent to device 140. Upon receipt, device 140 adds the received message buffer to remote message buffer queue 446. If there were a filter on the (b) vertex of the query path pattern, instance 450 would verify the match of {b:v3}. However, since there is no such filter, instance 450 utilizes the remote intermediate result as it would a local second-stage match.

Returning to the illustration of step 508 with respect to thread 422A, after causing the local message buffer with the intermediate results {a:v0; b:v1}, and {a:v0, b:v2} to be included in queue 414, thread 422A determines whether there are at least the threshold number of intermediate results in queues 414 and 416. At this time, there are at least eight intermediate results in the queues (including intermediate results that thread 422A has produced and at least four intermediate results produced by other processing entities, either local or remote). In response to determining that there are at least the threshold number of intermediate results in queues 414 and 416, thread 422A enters DFS mode.

In DFS mode, thread 422A uses DFS-based traversal techniques to expand intermediate results of the query to final results. According to an embodiment, thread 422A scans queues 414 and 416 to identify intermediate results that are in the latest stage available to expand using DFS-based traversal techniques. For example, thread 422A scans remote message buffer queue 416 for intermediate results that are in the fourth stage of query execution (i.e., remote intermediate results that have tentative matches to the (d) vertex in the query path pattern, which are tentative because of the filter on (d)), then for intermediate results that are in the third stage of query execution (i.e., matched to vertex (c)), and then, if there are no later-stage intermediate results, intermediate results in the second stage of query execution (i.e., matched to vertex (b)). Continuing with the above example, the latest-stage intermediate results in local message buffer queue 414 are at the second stage of query execution. Accordingly, thread 422A picks up intermediate result {a:v0; b:v2} from queue 414 for DFS-based result expansion.

To illustrate DFS-based result expansion, thread 422A expands {a:v0; b:v2} to {a:v0; b:v2; c:v1} via edge 608 for the third query execution stage, and then to {a:v0; b:v2; c:v1; d:v0} via edge 604 for the fourth query execution stage based on determining that the age property of v0 is greater than or equal to '40' (as per the filter on vertex (d) in Query 2). Thread 422A includes {a:v0; b:v2; c:v1; d:v0} in a final result set for Query 2.

According to DFS-based traversal techniques, after identifying the final query result, thread 422A backtracks to {a:v0; b:v2; c:v1} and identifies a remote edge 610 between v1 and v3 (which is owned by device 140). Thus, thread 422A expands {a:v0; b:v2; c:v1} to a tentative fourth-stage intermediate result, {a:v0; b:v2; c:v1; d:v3}, and includes the tentative intermediate results in an inter-machine message buffer destined for device 140. This intermediate fourth-stage result is tentative because device 140 must verify whether the tentative match of {d:v3} satisfies the filter on vertex (d) in Query 2. The inter-machine message buffer is sent to device 140 when the buffer is full, as described above.

According to DFS-based traversal techniques, thread 422A backtracks again to {a:v0; b:v2; c:v1} and identifies another remote edge 614 between v1 and v5 (which is also owned by device 140). Thus, thread 422A expands the third-stage intermediate result to a second tentative fourth-stage intermediate result, {a:v0; b:v2; c:v1; d:v5}, and includes the tentative intermediate result in the inter-machine message buffer destined for device 140.

After the inter-machine message buffer is sent to device 140, instance 450 causes the received message buffer to be included in remote message buffer queue 446. As the threads implementing instance 450 become available, as described herein, instance 450 verifies whether the tentative matches for vertex (d) of the query path pattern satisfy the filter on vertex (d) in Query 2. To illustrate, thread 452A, working in DFS mode, picks up {a:v0; b:v2; c:v1; d:v3} from queue 446 and evaluates whether the tentative match {d:v3} satisfies the filter on the 'age' property of vertex (d) in Query 2. Thread 452A determines that, because the value of the 'age' property of v3 is '40', v3 satisfies the filter on the 'age' property of (d) in Query 2. As such, thread 452A includes {a:v0; b:v2; c:v1; d:v3} in the final result set for Query 2.

Thread 452A then picks up {a:v0; b:v2; c:v1; d:v5} from queue 446 and evaluates whether the tentative match {d:v5} satisfies the filter on the 'age' property of vertex (d) in Query 2. Thread 452A determines that, because the value of the 'age' property of v5 is '0', v5 does not satisfy the filter on the 'age' property of (d) in Query 2. Thread 452A does not do any backtracking to previous stages of the intermediate result according to DFS-based traversal techniques because exploration of paths leading from {a:v0; b:v2; c:v1} is performed by the remote machine that stores v1.

Flow Control

According to an embodiment, each machine of a distributed DBMS keeps track of a number of unacknowledged intermediate results that have been sent to remote machines. Using this tracked information, each machine of the distributed DBMS implements a flow control by which the machine controls the number and nature of messages being sent to the remote machines. Such flow control helps to keep memory usage within target memory limits while facilitating avoidance of deadlock situations. Specifically, each machine allows up to a threshold number of unacknowledged messages to be sent to a given remote machine at a time. Once a received message has been processed, the machine that received the message sends an acknowledgement of the processed message to the source machine of the message.

Furthermore, according to an embodiment, the machines ensure that at least a portion of the traffic that is sent to a given remote machine, at any given time, is dedicated to each stage of the query plan. In this example, each inter-machine message buffer maintained by device 110 is assigned a stage of the query execution plan as well as a destination machine, and only intermediate results that correspond to the stage of a given inter-machine message buffer is included in the buffer. Reservation of at least a portion of inter-machine bandwidth for each stage of query execution ensures that the intermediate results are able to be converted to final results, and that later-stage intermediate results are not held up by an excessive number of early-stage intermediate results being communicated between machines.

For example, for execution of Query 2, device 110 maintains a configurable threshold of six unacknowledged message buffers to be sent to a given remote machine, where two of the total six message buffers are reserved for each stage (other than the first stage, which is performed locally) of the Query 2 execution plan. According to the example above, thread 422A produces the tentative intermediate result {a:v0; b:v2; c:v1; d:v5}, and includes the intermediate result in an inter-machine message buffer that is destined for device 140 and is associated with the fourth stage of the Query 2 execution plan. At that point, device 110 determines that the inter-machine message buffer is full, and, as such, is ready to be sent to device 140.

In accordance with the flow-control mechanism described above, device 110 determines how many unacknowledged fourth-stage message buffers have been sent to device 140. If there are less than two such unacknowledged message buffers, device 110 causes the full inter-machine message buffer to be sent to device 140. If device 110 has sent two or more unacknowledged fourth-stage message buffers to device 140, then device 110 waits to send the full inter-machine message buffer until at least one of the unacknowledged fourth-stage message buffers is acknowledged by device 140.

According to an embodiment, if there is no space for a processing entity to include a remote intermediate result in an appropriate inter-machine message buffer, the processing entity moves on to other available work (depending on the operating mode of the processing entity) and attempts to include the tentative intermediate result in the appropriate inter-machine message buffer at a later time. For example, if the processing entity cannot send a full inter-machine message buffer for the fourth-stage, the processing entity stops producing work for that stage and attempts performance of work for any other stage that has available work. Because these fourth-stage messages on the remote machine can always be completed locally at the remote machine, it is deterministic that sooner or later the necessary acknowledgment will arrive.

According to an embodiment, a database server instance monitors memory consumption during query execution based on user-configurable settings. According to embodiments, such limits can be defined either per-machine, or globally and then split across the machines implementing a distributed DBMS. For example, a user indicates a limit to the amount of memory to be used to execute queries. This amount of memory is used to allocate buffers for intermediate results, including local buffers for local intermediate results, as well as for an inter-machine message buffers. For example, 8 GB of memory can be used as: 8 KB*8192 buffers=64 MB for local buffers; and 128 KB*65024 buffers=8128 MB for inter-machine message buffers, which are subsequently split for incoming and outgoing messages.

Furthermore, because flow control uses a fixed number of inter-machine message buffers, the buffers may be registered with a NIC, which enables zero-copy messaging. Specifically, as described above, remote edges are directly buffered to the NIC, which enables zero-copy messaging, according to an embodiment. Thus, the intermediate results are inserted directly into an inter-machine message buffer registered with NIC 418, which can be sent as-is, without any modification or copying for any underlying messaging library.

Final Results Management

According to an embodiment, to constrain memory consumption further, the final results that are produced during query execution are streamed to a secondary storage. For example, when a final result is added to the final result set, the final result is stored to a table of results that is distributed across database data 102 (stored in first persistent storage 430) and in database data 104 (stored in second persistent storage 460). According to an embodiment, streaming of final results to secondary storage is performed asynchronously by one or more background threads.

Query Planning and Optimization

According to an embodiment, a query planner for system 400 configures dynamic traversal for a given query based on information about the target graph data of the query. For example, the query planner generates a plan for a query that includes a very strict filter in a particular stage of query execution, such as a filter that selects a certain vertex identifier (which matches to only one vertex in the graph data), or a filter that selects vertices with a certain label (which is present in only a small percentage of vertices in the target graph data). Based on the existence of this very strict filter, the query planner configures the dynamic traversal of the query to take advantage of, or compensate for, the small number of nodes that match the filter. For example, if the filter is at an early stage of query execution, the query plan directs processing entities to initiate query execution in DFS mode up to the stage with the strict filter to quickly identify the small number of nodes that satisfy the filter. The query plan further directs that, for intermediate results at or beyond the stage with the strict filter, processing entities process the intermediate results in BFS mode to increase the number of intermediate results in memory to at least the threshold number.

As a further example, the query planner adjusts the size of the message buffers to be used for local intermediate results to optimize query execution for a given query. For example, the query planner reduces the size of local message buffers being used for a given query to cause intermediate results to be more speedily available after completion of a query execution stage with a strict filter.

Furthermore, for simplicity of illustration herein, no additional query optimizations, such as reordering of explored vertices, are described. However, additional query optimization may be implemented as desired in connection with techniques described herein. To illustrate, when optimizing Query 2, a query optimizer might choose to start the path exploration from vertex (d) of the query path pattern because this vertex is associated with a filter in the query. In this case, the query optimizer uses reverse edges to go to vertices (c), (b) and (a) in the query path pattern.

General Overview: Database Systems

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node DBMS is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Database System Configuration

A database client, not depicted in FIG. 4, connects to database system 400. The client may comprise a database application running on a client node. The client interacts with an instance of database system 400, such as one of instances 420 and 450, by submitting commands that cause the instance to perform operations on data stored in the database. For example, a command may be a request to access or modify data from the database, perform operations on the data, and/or return the data to the client.

Typically, distributed database system 400 is implemented by multiple machines (including device 110 and device 140) that are remotely connected. Referring to FIG. 4, database server instance 420, running on device 110, maintains first database data 102 in persistent storage 430, and database server instance 450, running on device 140, maintains second database data 104 in persistent storage 460. Both database data 102 and database data 104 include graph database data for graph database 100.

According to an embodiment, devices 110 and 140 correspond to clustered machines known as nodes, each running a database server instance, as described above. A database server instance (or "instance") is a server that comprises a combination of the software and allocation of resources from a machine node. Specifically, a server, such as a database server, or any other process is a combination of integrated software components and an allocation of computational resources, such as memory, a node (i.e., a computing device and/or memory accessible to the computing device), and/or sub-processes on the node for executing the integrated software components on a processor, the combination of the software and computational resources being dedicated to performing a particular function on behalf of one or more clients. Instances 420 and 450 collectively implement server-side functions of distributed database system 400.

Database data 102 and 104 may each reside in volatile and/or non-volatile storage, such as first volatile memory 412, second volatile memory 442, first persistent storage 430, and second persistent storage 460. Each node implementing distributed database system 400 may include a virtual disk and/or a set of physical disks. Additionally or alternatively, database data 102 and 104 may each be stored, at least in part, in main memory of a database server computing device.

Database data for graph database 100 may be stored in any type of computer-readable storage media, such as flash storage or non-volatile memory. In some embodiments, graph database 100 is a distributed database comprising a plurality of databases each stored in a respective one or more storage media. In other embodiments, machines implementing the database system have shared access to at least a portion of graph database 100 via shared access to storage storing database data for graph database 100.

One or more of the functions attributed to any process described herein, may be performed any other logical entity that may or may not be depicted in FIG. 4, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
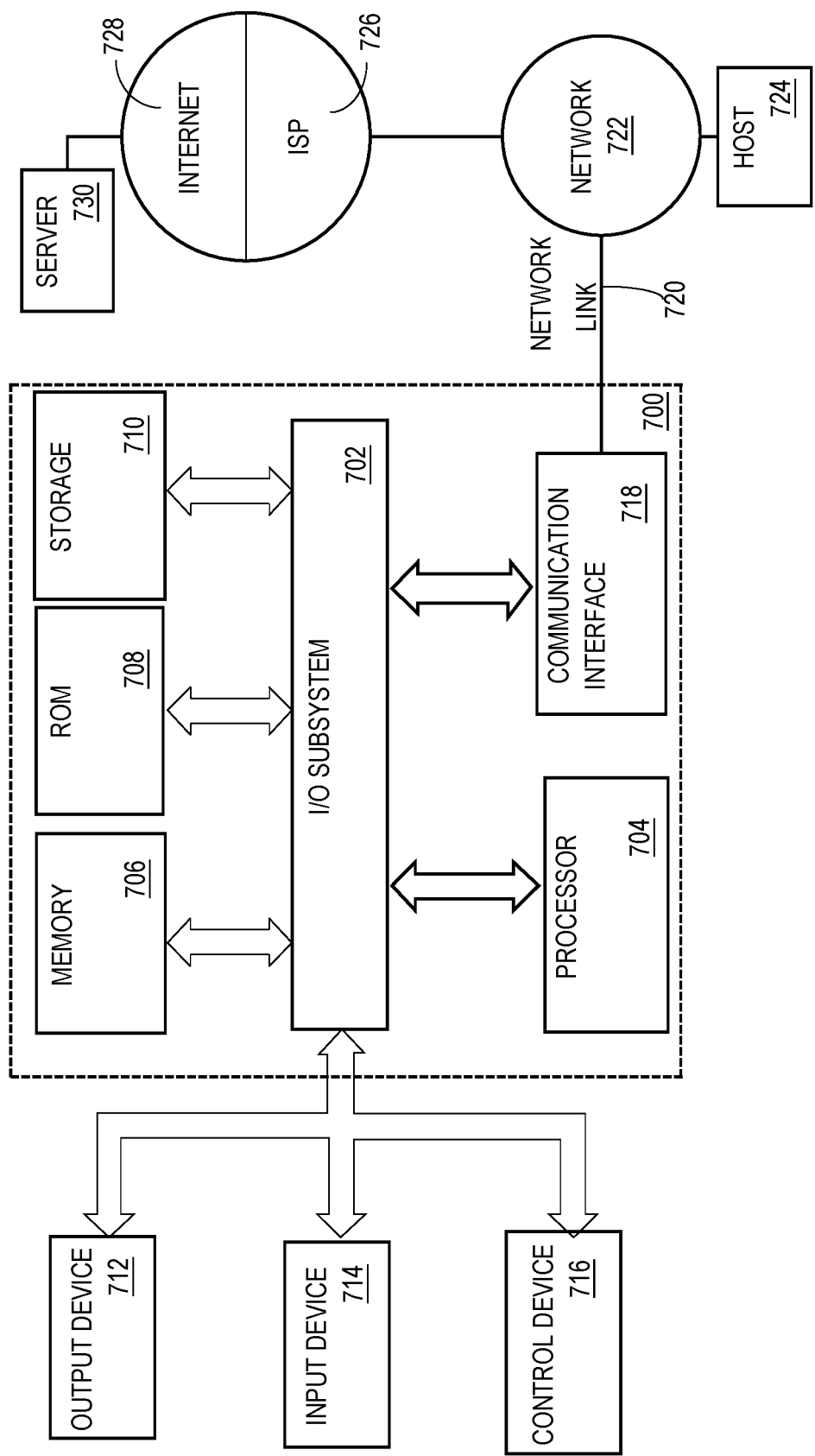
FIG. 7 is a block diagram of a computer system on which embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
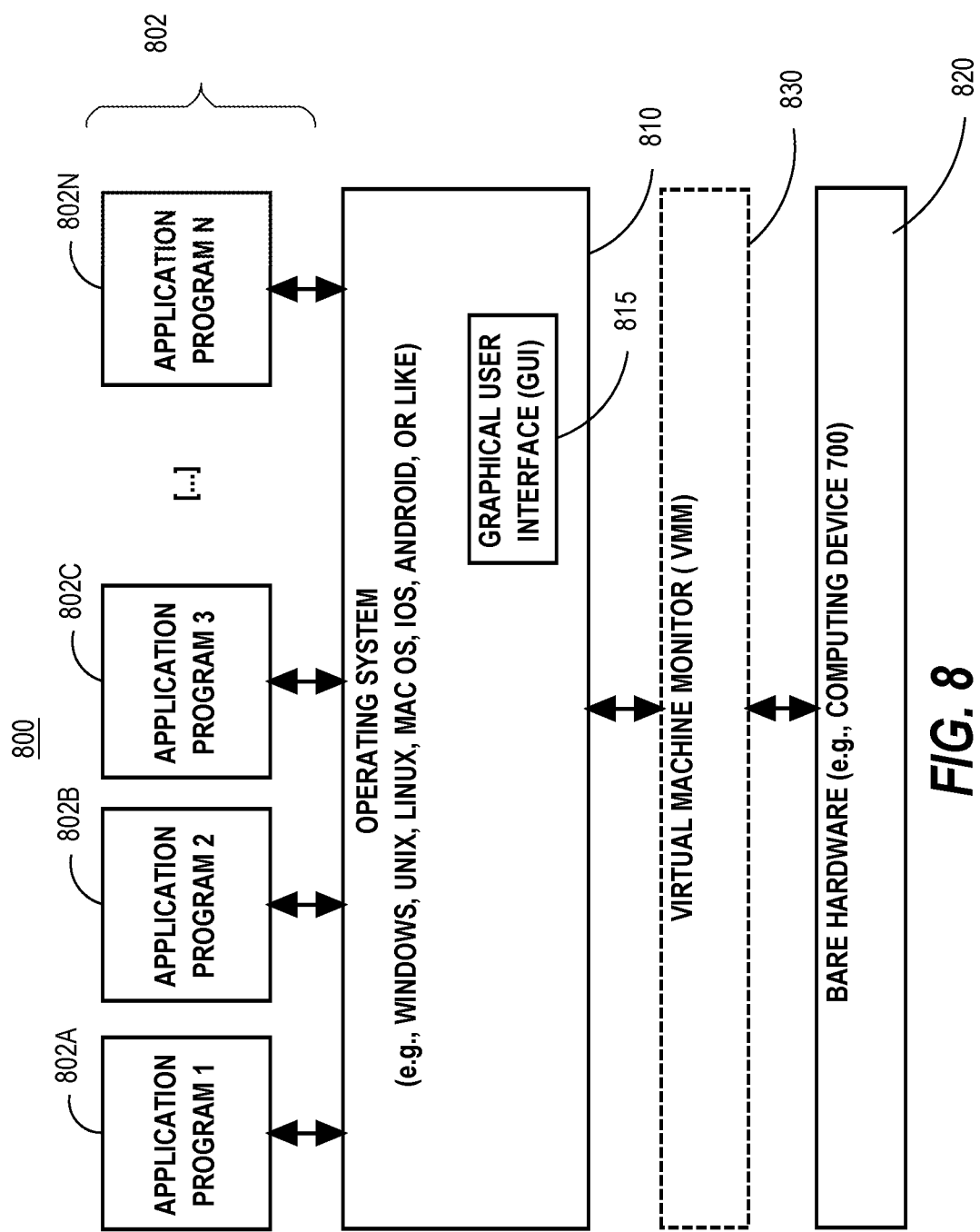
FIG. 8 depicts a software system that may be used in an embodiment.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   executing, by a database server instance of a database management system, a query over graph data maintained in a graph database by the database management system;
   wherein the graph data comprises a plurality of vertices and a plurality of edges that represent relationships between the plurality of vertices;
   wherein the database server instance is implemented by a plurality of processing threads running on a computing device of the database management system;
   wherein said executing the query over the graph data comprises:
   a particular thread, of the plurality of processing threads, determining that there are less than a threshold number of intermediate results in one or more intermediate result queues in memory of the computing device;
   in response to determining that there are less than the threshold number of intermediate results in the one or more intermediate result queues, the particular thread operating in an intermediate results production mode comprising:
   the particular thread using breadth-first traversal techniques to produce one or more intermediate results for the query, and the particular thread inserting the one or more intermediate results into at least one intermediate result queue of the one or more intermediate result queues; and in response to determining that there are at least the threshold number of intermediate results in the one or more intermediate result queues and after inserting the one or more intermediate results into the at least one intermediate result queue, modifying executing of said query over the graph data from using the breadth-first traversal techniques in the intermediate results production mode to using depth-first traversal techniques to produce one or more results for the query in a final results production mode.

2. The computer-executed method of claim 1, wherein:
the computing device of the database management system is a particular computing device;
the one or more intermediate result queues comprise one or both of:
   a local intermediate result queue configured to store intermediate results produced by the plurality of processing threads, and
   a remote intermediate result queue configured to store intermediate results produced by one or more computing devices, other than the particular computing device, of the database management system.

3. The computer-executed method of claim 1, wherein:
the one or more intermediate result queues store message buffers;
the particular thread inserting the one or more intermediate results into the at least one intermediate result queue comprises:
   the particular thread populating a message buffer with at least a portion of the one or more intermediate results, and
   causing a particular intermediate result queue, of the one or more intermediate result queues, to include the message buffer.

4. The computer-executed method of claim 1, wherein said executing the query over the graph data further comprises:
   identifying a remote edge that is owned by a second computing device of the database management system;
   in response to identifying the remote edge, including a particular intermediate result that is based, at least in part, on the remote edge in a particular message buffer;
   after including the particular intermediate result in the particular message buffer, determining that the particular message buffer is full; and
   in response to determining that the particular message buffer is full, sending the particular message buffer to the second computing device.

5. The computer-executed method of claim 4, wherein:
the computing device of the database management system is a particular computing device;
the particular message buffer is registered with a network interface card (NIC) of the particular computing device;
sending the particular message buffer to the second computing device comprises:
   producing communication structures directly from the particular message buffer, and
   sending the communication structures, to the second computing device, over a network that communicatively couples the particular computing device and the second computing device.

6. The computer-executed method of claim 4, wherein:
the computing device of the database management system is a particular computing device;
the method further comprises:
   selecting the particular message buffer to store the particular intermediate result based, at least in part, on both (a) an owner of a destination vertex of the remote edge being the second computing device, and (b) a stage of query execution at which the remote edge was discovered;
   wherein sending the particular message buffer to the second computing device is further based on determining that a number of unacknowledged message buffers, sent to the second computing device for the stage of query execution, does not exceed a limit on the number of unacknowledged message buffers.

7. The computer-executed method of claim 1, further comprising:
   identifying a plurality of query execution stages for the query;
   wherein the plurality of query execution stages is ordered from earliest query execution stage to latest query execution stage;
   wherein said executing the query over the graph data is performed based on the plurality of query execution stages;
   wherein the particular thread using depth-first traversal techniques to produce the one or more results for the query comprises:
      scanning intermediate results, in the one or more intermediate result queues, to identify one or more late intermediate results for one or more of the latest query execution stages, of the plurality of query execution stages;
      producing the one or more results for the query based, at least in part, on using depth-first traversal techniques on the one or more late intermediate results.

8. The computer-executed method of claim 1, further comprising:
   identifying a plurality of query execution stages for the query;
   wherein the plurality of query execution stages is ordered from earliest query execution stage to latest query execution stage;
   wherein said executing the query over the graph data is performed based on the plurality of query execution stages;
   wherein the particular thread using the breadth-first traversal techniques to produce the one or more intermediate results for the query comprises:
      scanning intermediate results, in the one or more intermediate result queues, to identify one or more early intermediate results for one or more of earlier query execution stages, of the plurality of query execution stages;
      producing the one or more intermediate results based, at least in part, on using the breadth-first traversal techniques on the one or more early intermediate results.

9. One or more non-transitory computer-readable media storing one or more sequences of instructions that, when executed by one or more processors, cause:
   executing, by a database server instance of a database management system, a query over graph data maintained in a graph database by the database management system;

wherein the graph data comprises a plurality of vertices and a plurality of edges that represent relationships between the plurality of vertices;

wherein the database server instance is implemented by a plurality of processing threads running on a computing device of the database management system;

wherein said executing the query over the graph data comprises:
  a particular thread, of the plurality of processing threads, determining that there are less than a threshold number of intermediate results in one or more intermediate result queues in memory of the computing device;
  in response to determining that there are less than the threshold number of intermediate results in the one or more intermediate result queues, the particular thread operating in an intermediate results production mode comprising:
    the particular thread using breadth-first traversal techniques to produce one or more intermediate results for the query, and
    the particular thread inserting the one or more intermediate results into at least one intermediate result queue of the one or more intermediate result queues; and
  in response to determining that there are at least the threshold number of intermediate results in the one or more intermediate result queues and after inserting the one or more intermediate results into the at least one intermediate result queue, modifying executing of said query over the graph data from using the breadth-first traversal techniques in the intermediate results production mode to using depth-first traversal techniques to produce one or more results for the query in a final results production mode.

10. The one or more non-transitory computer-readable media of claim 9, wherein:
  the computing device of the database management system is a particular computing device;
  the one or more intermediate result queues comprise one or both of:
    a local intermediate result queue configured to store intermediate results produced by the plurality of processing threads, and
    a remote intermediate result queue configured to store intermediate results produced by one or more computing devices, other than the particular computing device, of the database management system.

11. The one or more non-transitory computer-readable media of claim 9, wherein:
  the one or more intermediate result queues store message buffers;
  the particular thread inserting the one or more intermediate results into the at least one intermediate result queue comprises:
    the particular thread populating a message buffer with at least a portion of the one or more intermediate results, and
    causing a particular intermediate result queue, of the one or more intermediate result queues, to include the message buffer.

12. The one or more non-transitory computer-readable media of claim 9, wherein said executing the query over the graph data further comprises:
  identifying a remote edge that is owned by a second computing device of the database management system;
  in response to identifying the remote edge, including a particular intermediate result that is based, at least in part, on the remote edge in a particular message buffer;
  after including the particular intermediate result in the particular message buffer, determining that the particular message buffer is full; and
  in response to determining that the particular message buffer is full, sending the particular message buffer to the second computing device.

13. The one or more non-transitory computer-readable media of claim 12, wherein:
  the computing device of the database management system is a particular computing device;
  the particular message buffer is registered with a network interface card (NIC) of the particular computing device;
  sending the particular message buffer to the second computing device comprises:
    producing communication structures directly from the particular message buffer, and
    sending the communication structures, to the second computing device, over a network that communicatively couples the particular computing device and the second computing device.

14. The one or more non-transitory computer-readable media of claim 12, wherein:
  the computing device of the database management system is a particular computing device;
  the one or more sequences of instructions comprise instructions that, when executed by one or more processors, cause:
    selecting the particular message buffer to store the particular intermediate result based, at least in part, on both (a) an owner of a destination vertex of the remote edge being the second computing device, and (b) a stage of query execution at which the remote edge was discovered;
    wherein sending the particular message buffer to the second computing device is further based on determining that a number of unacknowledged message buffers, sent to the second computing device for the stage of query execution, does not exceed a limit on the number of unacknowledged message buffers.

15. The one or more non-transitory computer-readable media of claim 9, wherein the one or more sequences of instructions comprise instructions that, when executed by one or more processors, cause:
  identifying a plurality of query execution stages for the query;
  wherein the plurality of query execution stages is ordered from earliest query execution stage to latest query execution stage;
  wherein said executing the query over the graph data is performed based on the plurality of query execution stages;
  wherein the particular thread using depth-first traversal techniques to produce the one or more results for the query comprises:
    scanning intermediate results, in the one or more intermediate result queues, to identify one or more late intermediate results for one or more of the latest query execution stages, of the plurality of query execution stages;
    producing the one or more results for the query based, at least in part, on using depth-first traversal techniques on the one or more late intermediate results.

16. The one or more non-transitory computer-readable media of claim 9, wherein the one or more sequences of instructions comprise instructions that, when executed by one or more processors, cause:
- identifying a plurality of query execution stages for the query;
- wherein the plurality of query execution stages is ordered from earliest query execution stage to latest query execution stage;
- wherein said executing the query over the graph data is performed based on the plurality of query execution stages;
- wherein the particular thread using the breadth-first traversal techniques to produce the one or more intermediate results for the query comprises:
  - scanning intermediate results, in the one or more intermediate result queues, to identify one or more early intermediate results for one or more of earlier query execution stages, of the plurality of query execution stages;
  - producing the one or more intermediate results based, at least in part, on using the breadth-first traversal techniques on the one or more early intermediate results.

17. The computer-executed method of claim 1, wherein using depth-first traversal techniques to produce one or more results for the query is based, at least in part, on particular one or more intermediate results from at least one intermediate result queue of the one or more intermediate result queues.

18. The one or more non-transitory computer-readable media of claim 9, wherein using depth-first traversal techniques to produce one or more results for the query is based, at least in part, on particular one or more intermediate results from at least one intermediate result queue of the one or more intermediate result queues.

* * * * *

UNITED STATES PATENT AND TRADEMARK OFFICE
CERTIFICATE OF CORRECTION

| | | |
|---|---|---|
| PATENT NO. | : 11,675,785 B2 | Page 1 of 1 |
| APPLICATION NO. | : 16/778668 | |
| DATED | : June 13, 2023 | |
| INVENTOR(S) | : Trigonakis et al. | |

It is certified that error appears in the above-identified patent and that said Letters Patent is hereby corrected as shown below:

On the Title Page

On page 2, Column 1, under U.S. Patent Documents, Line 25, delete "Parades" and insert -- Paradies --, therefor.

On page 2, Column 1, under U.S. Patent Documents, Line 45, delete "Bed" and insert -- Bedi --, therefor.

On page 2, Column 2, under Other Publications, Line 9, delete "Taversals" and insert -- Traversals --, therefor.

On page 2, Column 2, under Other Publications, Line 32, delete "Grpah" and insert -- Graph --, therefor.

On page 2, Column 2, under Other Publications, Line 35, delete "Neptun" and insert -- Neptune --, therefor.

On page 2, Column 2, under Other Publications, Line 40, delete "Lanuage"," and insert -- Language", --, therefor.

On page 3, Column 1, under Other Publications, Line 18, delete "Confrence," and insert -- Conference, --, therefor.

On page 3, Column 1, under Other Publications, Line 20, delete "SIGMQD'09," and insert -- SIGMOD'09, --, therefor.

On page 3, Column 2, under Other Publications, Line 6, delete "Endowmwnt," and insert -- Endowment, --, therefor.

Signed and Sealed this
Second Day of April, 2024

Katherine Kelly Vidal
*Director of the United States Patent and Trademark Office*